(12) United States Patent
Takeya et al.

(10) Patent No.: US 10,773,696 B2
(45) Date of Patent: Sep. 15, 2020

(54) HYDRAULIC CONTROL DEVICE FOR VEHICLES

(71) Applicant: ADVICS CO., LTD., Kariya-shi, Aichi-ken (JP)

(72) Inventors: Yusuke Takeya, Miyoshi (JP); Kosuke Hashimoto, Kariya (JP); Shun Nohira, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 109 days.

(21) Appl. No.: 15/761,581

(22) PCT Filed: Sep. 28, 2016

(86) PCT No.: PCT/JP2016/078619
§ 371 (c)(1),
(2) Date: Mar. 20, 2018

(87) PCT Pub. No.: WO2017/057457
PCT Pub. Date: Apr. 6, 2017

(65) Prior Publication Data
US 2018/0339684 A1    Nov. 29, 2018

(30) Foreign Application Priority Data

Sep. 28, 2015 (JP) .................. 2015-190163
Feb. 29, 2016 (JP) .................. 2016-037345

(51) Int. Cl.
*B60T 13/68* (2006.01)
*B60T 8/173* (2006.01)
(Continued)

(52) U.S. Cl.
CPC ............... *B60T 8/173* (2013.01); *B60T 8/00* (2013.01); *B60T 8/17* (2013.01); *B60T 8/34* (2013.01);
(Continued)

(58) Field of Classification Search
CPC ........ B60T 8/36; B60T 8/3605; B60T 8/3655; B60T 8/366; B60T 13/142; B60T 13/146;
(Continued)

(56) References Cited

U.S. PATENT DOCUMENTS

2006/0087173 A1* 4/2006 Kajiyama ............. B60T 8/3655
                                                              303/3
2008/0238186 A1* 10/2008 Suzuki ................... B60T 8/367
                                                              303/20
(Continued)

FOREIGN PATENT DOCUMENTS

JP    2007069684 A  *  3/2007
JP    2008014397 A  *  1/2008
(Continued)

OTHER PUBLICATIONS

International Search Report (PCT/ISA/210) dated Nov. 22, 2016, by the Japanese Patent Office as the International Searching Authority for International Application No. PCT/JP2016/078619.

*Primary Examiner* — Bradley T King
*Assistant Examiner* — Stephen M Bowes
(74) *Attorney, Agent, or Firm* — Buchanan Ingersoll & Rooney PC

(57) ABSTRACT

In the present invention, a brake device is equipped with: differential pressure control valves; pressure adjusting units which are connected to the differential pressure control valves through liquid passages; and a control device which controls the WC pressure Pwc in wheel cylinders by operating the differential pressure control valves and the pressure adjusting units. When predetermined suppression control
(Continued)

permission conditions are satisfied while both the supply pumps of the pressure adjusting units and the differential pressure control valves are in operation, the control device performs self-excited vibration suppression control over the differential pressure control valves, the self-excited vibration suppression control being carried out in such a manner that a valve element separated from a valve seat is caused to abut on the valve seat, and, upon abutting on the valve seat, the valve element is separated from the valve seat.

13 Claims, 12 Drawing Sheets

(51) Int. Cl.
    *B60T 13/16*     (2006.01)
    *B60T 8/00*     (2006.01)
    *B60T 8/17*     (2006.01)
    *B60T 13/66*     (2006.01)
    *F16K 31/06*     (2006.01)
    *B60T 8/34*     (2006.01)

(52) U.S. Cl.
    CPC .......... *B60T 13/166* (2013.01); *B60T 13/662* (2013.01); *B60T 13/686* (2013.01); *F16K 31/06* (2013.01); *F16K 31/0655* (2013.01)

(58) Field of Classification Search
    CPC ...... B60T 13/662; B60T 13/68; B60T 13/686; F16K 31/06; F16K 31/0655
    See application file for complete search history.

(56) References Cited

U.S. PATENT DOCUMENTS

| | | | |
|---|---|---|---|
| 2010/0213758 A1* | 8/2010 | Nanahara | B60T 8/363 303/20 |
| 2010/0314567 A1* | 12/2010 | Uechi | B60T 8/36 251/129.15 |
| 2013/0153801 A1* | 6/2013 | Sato | F16K 31/0655 251/129.21 |
| 2013/0197770 A1* | 8/2013 | Osaki | B60T 8/34 701/70 |
| 2014/0306514 A1 | 10/2014 | Foitzik et al. | |

FOREIGN PATENT DOCUMENTS

| | | | |
|---|---|---|---|
| JP | 2011-84147 A | | 4/2011 |
| JP | 2011-099563 A | | 5/2011 |
| JP | 2011099563 A | * | 5/2011 |
| JP | 2014-205483 A | | 10/2014 |

* cited by examiner

Fig. 3

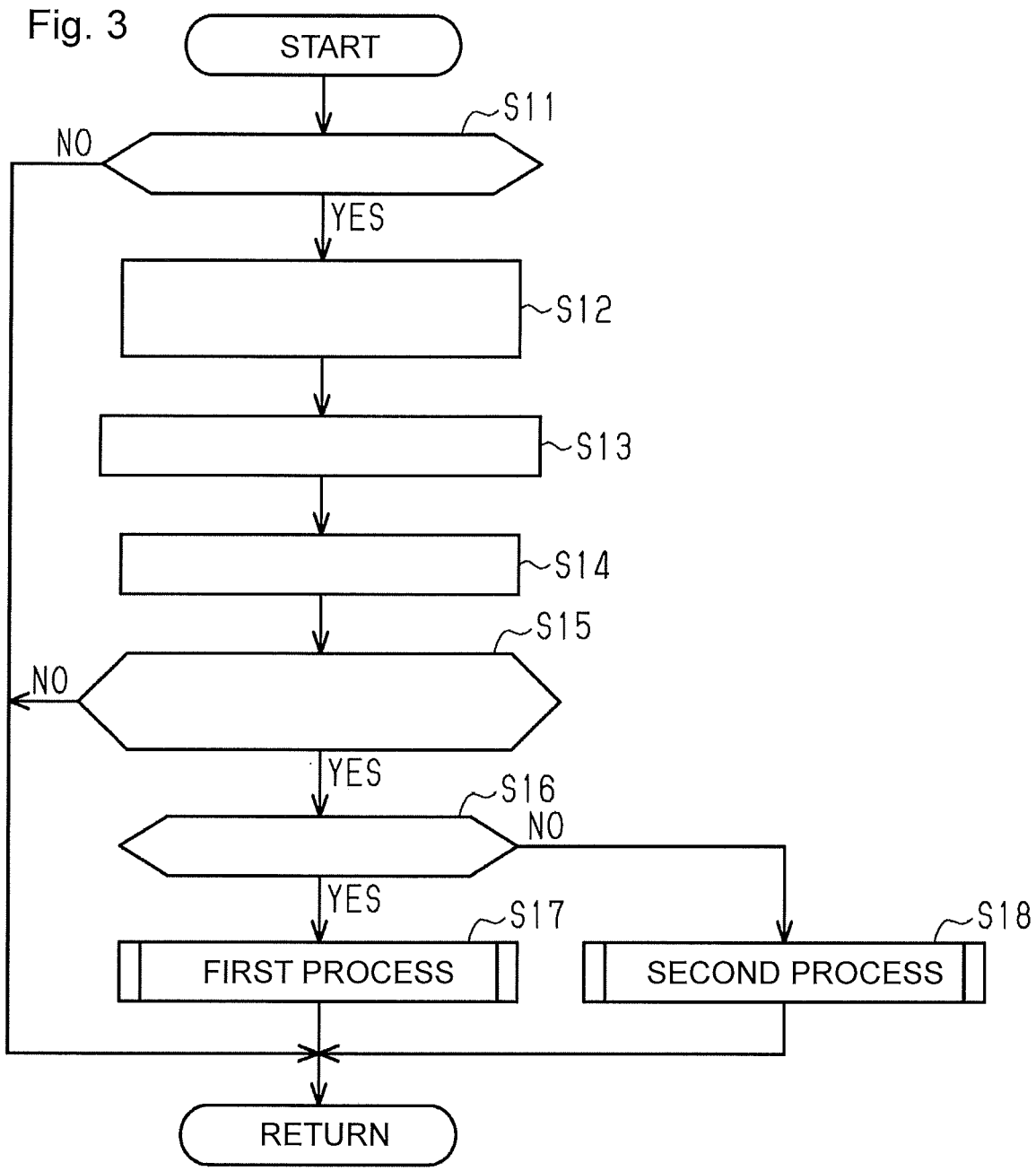

S11: ARE DIFFERENTIAL PRESSURE CONTROL VALVE AND SUPPLY PUMP BEING ACTUATED?
S12: ACQUIRE WC PRESSURE Pwc IN EACH WHEEL CYLINDER
S13: ACQUIRE INDICATOR CURRENT VALUE Ino FOR EACH RETENTION VALVE
S14: CALCULATE CHANGE RATE VIno OF INDICATOR CURRENT VALUE
S15: IS THERE ANY RETENTION VALVE IN WHICH VIno IS EQUAL TO OR HIGHER THAN DETERMINATION CHANGE RATE VInoTH1?
S16: RETENTION VALVE OF FIRST HYDRAULIC PRESSURE CIRCUIT?

Fig. 4

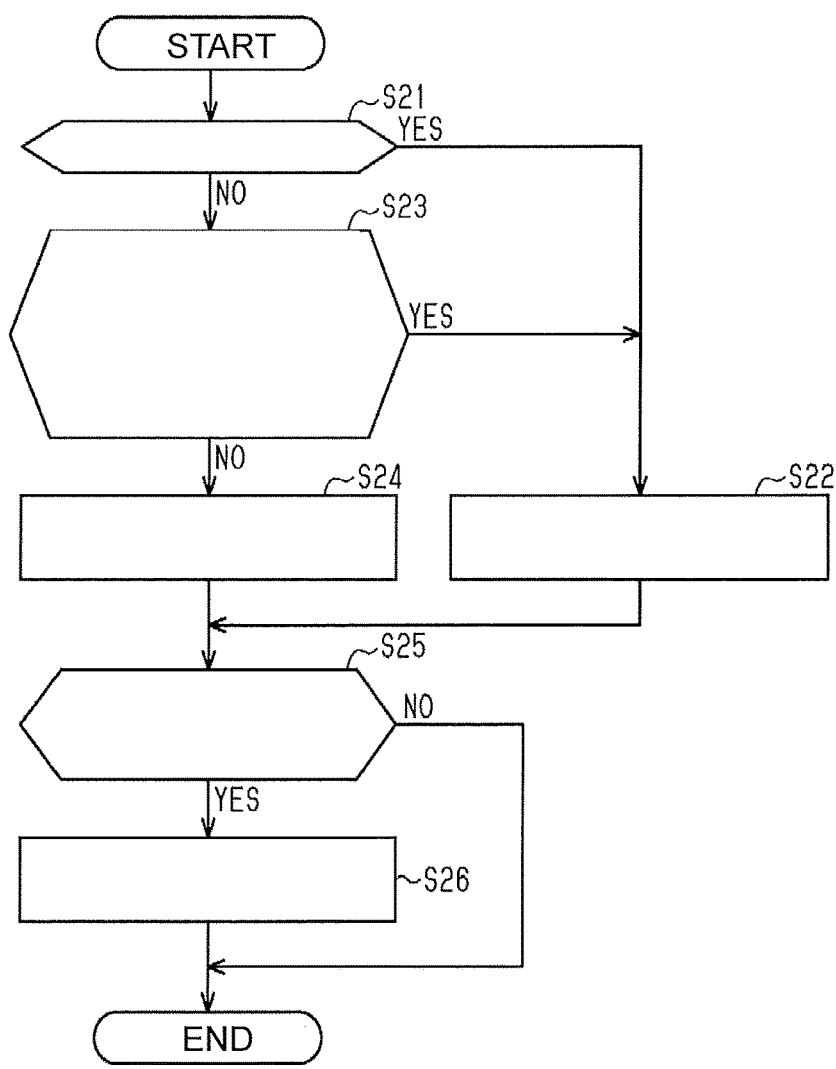

S21: ARE BOTH RETENTION VALVES CLOSED?
S23: ELEVENTH INTERMEDIATE HYDRAULIC PRESSURE PREDICTION VALUE PMEfl (= PMfr + Pupfl) > SYSTEM UPPER-LIMIT PRESSURE Pmax TWELFTH INTERMEDIATE HYDRAULIC PRESSURE PREDICTION VALUE PMErr (= PMrr + Puprr) > Pmax
S22: PROHIBIT SELF-EXCITED VIBRATION SUPPRESSION CONTROL FROM BEING EXECUTED TO DIFFERENTIAL PRESSURE CONTROL VALVE OF FIRST HYDRAULIC PRESSURE CIRCUIT
S24: PERMIT SELF-EXCITED VIBRATION SUPPRESSION CONTROL TO BE EXECUTED TO DIFFERENTIAL PRESSURE CONTROL VALVE OF FIRST HYDRAULIC PRESSURE CIRCUIT
S25: IS THERE RETENTION VALVE IN WHICH CHANGE RATE VIno OF INDICATOR CURRENT VALUE IS EQUAL TO OR HIGHER THAN OTHER EXECUTION DETERMINATION RATE VInoTH2
S26: PERMIT SELF-EXCITED VIBRATION SUPPRESSION CONTROL TO BE EXECUTED TO DIFFERENTIAL PRESSURE CONTROL VALVE OF SECOND HYDRAULIC PRESSURE CIRCUIT

Fig. 5

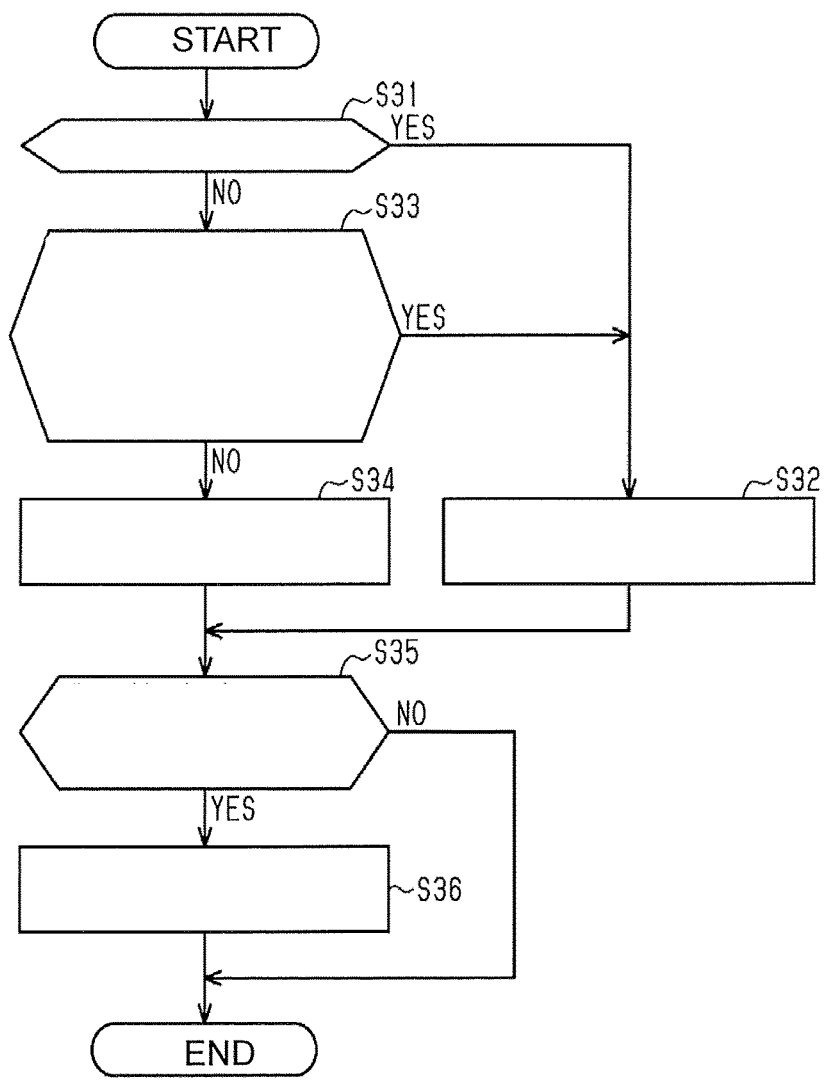

S31: ARE BOTH RETENTION VALVES CLOSED?
S33: TWENTY-FIRST INTERMEDIATE HYDRAULIC PRESSURE PREDICTION VALUE PMEfr (= PMfr + Pupfr) > SYSTEM UPPER-LIMIT PRESSURE Pmax
TWENTY-SECOND INTERMEDIATE HYDRAULIC PRESSURE PREDICTION VALUE PMErl (= PMrl + Puprl) > Pmax
S32: PROHIBIT SELF-EXCITED VIBRATION SUPPRESSION CONTROL FROM BEING EXECUTED TO DIFFERENTIAL PRESSURE CONTROL VALVE OF SECOND HYDRAULIC PRESSURE CIRCUIT
S34: PERMIT SELF-EXCITED VIBRATION SUPPRESSION CONTROL TO BE EXECUTED TO DIFFERENTIAL PRESSURE CONTROL VALVE OF SECOND HYDRAULIC PRESSURE CIRCUIT
S35: IS THERE ANY RETENTION VALVE IN WHICH CHANGE RATE Vlno OF INDICATOR CURRENT VALUE IS EQUAL TO OR HIGHER THAN OTHER EXECUTION DETERMINATION RATE VlnoTH2
S36: PERMIT SELF-EXCITED VIBRATION SUPPRESSION CONTROL TO BE EXECUTED TO DIFFERENTIAL PRESSURE CONTROL VALVE OF FIRST HYDRAULIC PRESSURE CIRCUIT S51: ARE BOTH RETENTION VALVES CLOSED?
S52: CALCULATE PREDICTED INCREMENT $\Delta Pwc\_upE$ OF WC PRESSURE
S53: $\Delta Pwc\_upE \geq$ control determination value $\Delta Pwc\_upTH$?
S54: EXECUTE SELF-EXCITED VIBRATION SUPPRESSION CONTROL
S55: PROHIBIT SELF-EXCITED VIBRATION SUPPRESSION CONTROL S53: Pwc_upE ≥ control determination value ΔPwc_upTH?
S531: RECALCULATE INDICATOR DIFFERENTIAL PRESSURE CURRENT VALUE Ism
S54: EXECUTE SELF-EXCITED VIBRATION SUPPRESSION CONTROL

HYDRAULIC CONTROL DEVICE FOR VEHICLES

TECHNICAL FIELD

The present invention relates a device that controls an inflow of fluid into a control target disposed in a vehicle and a hydraulic control device for vehicles including an electromagnetic valve connected to the control target through a flow path in which the fluid flows.

BACKGROUND ART

A brake fluid pressure control device for vehicle described in Patent Literature 1 includes a wheel cylinder serving as an example of a control target disposed on a wheel, an electromagnetic valve connected to the wheel cylinder through a flow path in which a brake fluid flows, and a control unit controlling a degree of opening of the electromagnetic valve by PWM control. The "PWM" is an abbreviation of "Pulse Width Modulation".

Note that the electromagnetic valve has a valve seat, a valve element that can reciprocally move in a direction approaching the valve seat and in a direction away from the valve seat, a solenoid in which a current having a magnitude depending on a control signal from the control unit flows. In the electromagnetic valve, electromagnetic force is generated depending on the current flowing in the solenoid to adjust the width of a spacing between the valve seat and the valve element, i.e., a degree of opening.

In the brake fluid pressure control device, under the situation in which the electromagnetic valve is controlled within a range in which the valve element is not seated on the valve seat, when the brake fluid flows in the electromagnetic valve through the flow path, the valve element of the electromagnetic valve may cause self-excited vibration. When the self-excited vibration occurs in the electromagnetic valve, abnormal noise is generated from the brake fluid pressure control device, and an occupant of the vehicle may feel uncomfortable.

Thus, in the brake fluid pressure control device described in Patent Literature 1, when occurrence of self-excited vibration in the electromagnetic valve is predicted, a frequency of a control signal to be input to the electromagnetic valve is set to be higher than a frequency in a normal state. Therefore, the self-excited vibration does not easily occur in the electromagnetic valve to suppress generation of abnormal noise caused by the self-excited vibration in the electromagnetic valve.

CITATIONS LIST

Patent Literature

Patent Literature 1: Japanese Unexamined Patent Application Publication No. 2011-84147

SUMMARY OF INVENTION

Technical Problems

As described in Patent Literature 1, when the frequency of a control signal to be input to the electromagnetic valve, the control unit (more specifically, a drive circuit included in the control unit) generating the control signal generates a large heat value, and the device may deteriorate in durability.

It is an object of the present invention to provide a hydraulic control device for vehicles that can suppress generation of abnormal noise caused by self-excited vibration occurring in an electromagnetic valve while preventing the device from being deteriorated in durability.

Solutions to Problems

A hydraulic control device for vehicles to solve the above problems includes an electromagnetic valve connected to a control target disposed in a vehicle through a fluid passage in which a fluid flows, a pressure adjusting unit connected to the electromagnetic valve through the fluid passage in which the fluid flows, and a control unit that is configured to actuate the electromagnetic valve and the pressure adjusting unit to control an inflow of the fluid into the control target. The electromagnetic valve has a valve seat, a valve element that is configured to move in a direction approaching the valve seat and in a direction away from the valve seat, a solenoid in which a current flows. The electromagnetic valve is configured to change a spacing between the valve seat and the valve element depending on the current flowing in the solenoid. In the hydraulic control device for vehicles, when predetermined suppression control permission conditions are satisfied under a situation in which both the electromagnetic valve and the pressure adjusting unit are actuated, the control unit executes, on the electromagnetic valve, a self-excited vibration suppression control that brings the valve element separated from the valve seat into contact with the valve seat, and separates the valve element from the valve seat when the valve element is brought into contact with the valve seat.

According to the above configuration, when a hydraulic pressure in a fluid passage connecting the pressure adjusting unit to the electromagnetic valve changes, the relationship between electromagnetic force generated in the electromagnetic valve and the hydraulic pressure breaks up, and self-excited vibration may occur in the electromagnetic valve. Accordingly, in the above configuration, when the predetermined suppression control permission conditions are satisfied when the electromagnetic valve and the pressure adjusting unit are actuated, the valve element of the electromagnetic valve is temporarily brought into contact with the valve seat by executing the self-excited vibration suppression control, namely, the valve element is temporarily pressed against the valve seat. In this manner, even though the self-excited vibration occurs in the electromagnetic valve, the self-excited vibration can be suppressed. As a result, abnormal noise generated from the hydraulic control device of the vehicle is not easily caused by the self-excited vibration.

In execution of the self-excited vibration suppression control, the state in which the valve element is brought into contact with the valve seat is temporary, and the valve element is separated from the valve seat immediately after the valve element has been brought into contact with the valve seat. More specifically, the self-excited vibration occurring in the electromagnetic valve can be suppressed without giving little influence on the inflow of fluid into the control target.

In the above configuration, the frequency of a control signal input to the electromagnetic valve does not need to be high. Accordingly, the control unit generating the control signal input to the electromagnetic valve is prevented from being deteriorated in durability.

Thus, the hydraulic control device can suppress abnormal noise caused by self-excited vibration in the electromagnetic valve, while being prevented from being deteriorated in durability.

For example when the control target is a wheel cylinder disposed on a wheel, the hydraulic control device for vehicles increases a hydraulic pressure in the wheel cylinder to increase brake force applied to the wheel.

The hydraulic control device for vehicles configured to adjust a hydraulic pressure in the wheel cylinder may include a hydraulic pressure generating device that is disposed opposite the wheel cylinder across the electromagnetic valve in the fluid passage in which the fluid flows and is configured to generate a hydraulic pressure depending on an operation of a brake operation member. In this case, the pressure adjusting unit may have a retention valve that is a normally-opened type electromagnetic valve disposed in the fluid passage connecting the electromagnetic valve to the wheel cylinder, and a pump configured to pump the fluid to the fluid passage connecting the retention valve to the electromagnetic valve. The electromagnetic valve may be a differential pressure control valve configured to adjust a differential pressure between a pressure on the hydraulic pressure generating device side of the electromagnetic valve and a pressure on the retention valve side of the electromagnetic valve in a situation in which the fluid is pumped from the pump. The control unit is configured to actuate the differential pressure control valve and the pressure adjusting unit to adjust the hydraulic pressure in the wheel cylinder.

In the hydraulic control device for vehicles having the above configuration, when self-excited vibration occurs in the differential pressure control valve, abnormal noise may be generated. In the above configuration, when the self-excited vibration suppression control is executed to the differential pressure control valve when the predetermined suppression control permission conditions are satisfied, the self-excited vibration in the differential pressure control valve is suppressed. Accordingly, abnormal noise caused by the self-excited vibration can be prevented from being generated.

Note that, when the self-excited vibration suppression control is executed, the differential pressure control valve is temporarily closed. When the differential pressure control valve is closed under the situation in which the retention valve is closed, a hydraulic pressure in the fluid passage connecting the retention valve to the differential pressure control valve is excessively high by pumping the fluid from the pump, and a load on the fluid passage easily becomes excessive.

Accordingly, in the hydraulic control device for vehicles, when the control unit actuates both the differential pressure control valve and the pump to adjust the hydraulic pressure in the wheel cylinder, then the control unit preferably executes the self-excited vibration suppression control on the differential pressure control valve on the assumption that the predetermined suppression control permission conditions are satisfied when the retention valve is not closed. With this configuration, when the retention valve is closed, the hydraulic pressure in the fluid passage connecting the retention valve to the differential pressure control valve may be excessive. Therefore, the self-excited vibration suppression control is not executed. Accordingly, the fluid passage is excessively loaded by the execution of the self-excited vibration suppression control, and the hydraulic pressure control device can be prevented from being deteriorated in duration.

It is assumed that a hydraulic pressure set to protect the fluid passage connecting the differential pressure control valve to the retention valve is defined as a system upper-limit pressure. In this case, when the self-excited vibration suppression control is executed under the situation in which the hydraulic pressure in the fluid passage connecting the differential pressure control valve to the retention valve is higher than the system upper-limit pressure by closing the differential pressure control valve, the fluid pressure in the fluid passage becomes excessive by pumping the fluid from the pump, and the fluid passage is excessively loaded.

Accordingly, in the above hydraulic control device for vehicles, when the control unit actuates both the differential pressure control valve and the pump to adjust the hydraulic pressure in the wheel cylinder, then the control unit preferably executes the self-excited vibration suppression control on the differential pressure control valve on the assumption that the suppression control permission conditions are satisfied when the hydraulic pressure in the fluid passage connecting the differential pressure control valve to the retention valve is predicted to be equal to or lower than the system upper-limit pressure when the differential pressure control valve is closed under this situation. With this configuration, when it is predicted that the hydraulic pressure in the fluid passage connecting the differential pressure control valve to the retention valve exceeds the system upper-limit pressure when the differential pressure control valve is closed, the self-excited vibration suppression control is not executed. Accordingly, the fluid passage is excessively loaded by the execution of the self-excited vibration suppression control, and the hydraulic control device can be prevented from being deteriorated in duration.

In this case, under a situation in which the differential pressure control valve and the pump are actuated to adjust the hydraulic pressure in the wheel cylinder, when the degree of opening of the retention valve is changed, the hydraulic pressure in the fluid passage connecting the retention valve to the differential pressure control valve easily changes. When a change rate of the degree of opening of the retention valve is higher when the hydraulic pressure in the fluid passage changes depending on the change in degree of opening of the retention valve, a change rate of the hydraulic pressure in the fluid passage also becomes higher, namely, pulsation occurs in the fluid passage. Accordingly, the relationship between electromagnetic force generated in the differential pressure control valve and the hydraulic pressure in the fluid passage breaks up, and it is predicted that self-excited vibration occurs in the differential pressure control valve. On the other hand, when the change rate of the degree of opening of the retention valve is lower, the change rate of the hydraulic pressure in the fluid passage also becomes lower. Thus, it is predicted that the relationship between the electromagnetic force generated in the differential pressure control valve and the hydraulic pressure in the fluid passage does not easily break up, and the self-excited vibration does not occur in the differential pressure control valve, or, even when the self-excited vibration occurs, the amplitude of the vibration is small.

In the hydraulic pressure control device for vehicle, the retention valve may be configured such that, as the current flowing in the retention valve increases, the degree of opening of the retention valve decreases, or a valve closing rate increases. In this case, when the control unit actuates both the differential pressure control valve and the pump to adjust the hydraulic pressure in the wheel cylinder, then the control unit preferably executes the self-excited vibration suppression control on the differential pressure control valve on the assumption that the predetermined suppression control permission conditions are satisfied when the change rate of the current flowing in the retention valve is equal to or higher than a determination change rate. With this configuration, when the change rate of the current flowing in the retention valve is equal to or higher than the determination change rate, since the change rate of the degree of opening of the retention valve is high, it can be predicted that self-excited vibration occurs in the differential pressure control valve. By executing the self-excited vibration suppression control when it is predicted that the self-excited vibration occurs in the differential pressure control valve, an unnecessary operation of the differential pressure control valve is suppressed to suppress the differential pressure control valve from being deteriorated in duration.

Note that, when the change rate of the degree of opening of the retention valve is higher, the change rate of the hydraulic pressure in the fluid passage connecting the differential pressure control valve to the retention valve becomes higher. Accordingly, the relationship between the hydraulic pressure in the fluid passage and electromagnetic force generated in the differential pressure control valve largely breaks up, and the amplitude of the self-excited vibration occurring in the differential pressure control valve easily becomes larger. Unless force pressing the valve element against the valve seat is increased when the amplitude of the self-excited vibration is larger, the self-excited vibration cannot be suppressed.

In the hydraulic control device for vehicles, in the self-excited vibration suppression control, the control unit preferably increases the force pressing the valve element against the valve seat when the valve element sits on the valve seat as the change rate of the current flowing in the retention valve is higher. With this configuration, when it is predicted that the self-excited vibration occurring in the differential pressure control valve is larger, the force pressing the valve element against the valve seat is increased by execution of the self-excited vibration suppression control. Thus, even though the amplitude of the self-excited vibration occurring in the differential pressure control valve is large, the self-excited vibration can be appropriately suppressed by execution of the self-excited vibration suppression control.

The hydraulic control device for vehicles may include a plurality of hydraulic pressure circuits each having a differential pressure control valve and a pressure adjusting unit. The hydraulic pressure circuits are connected through the hydraulic pressure generating device. Accordingly, when the self-excited vibration occurs in the differential pressure control valve of one of the hydraulic pressure circuits, the self-excited vibration is also transmitted to the other hydraulic pressure circuit through the hydraulic pressure generating device, and self-excited vibration may also occur in the differential pressure control valve in the other hydraulic pressure circuit.

Thus, in the hydraulic control device for vehicles, when the self-excited vibration suppression control is executed to the differential pressure control valve in one hydraulic pressure circuit of the plurality of hydraulic pressure circuits, the control unit preferably executes the self-excited vibration suppression control on the differential pressure control valve in the other hydraulic pressure circuit. With this configuration, when self-excited vibration occurring in the differential pressure control valve in one hydraulic pressure circuit of the plurality of hydraulic pressure circuits may cause self-excited vibration in the differential pressure control valve in the other hydraulic pressure circuit, the self-excited vibration suppression control is also executed to the differential pressure control valve in the other hydraulic pressure circuit. Accordingly, self-excited vibration occurring in the differential pressure control valve in the other hydraulic pressure circuit can also be suppressed.

BRIEF DESCRIPTION OF DRAWINGS

FIG. 3 is a flow chart for explaining a process routine executed by a control device configuring the brake device for vehicle, i.e., a process routine executed when a driver performs a brake operation.

FIG. 4 is a flow chart for explaining a process routine executed by the control device, i.e., a process routine executed when it is predicted that self-excited vibration occurs in a differential pressure control valve configuring a first hydraulic pressure circuit.

FIG. 5 is a flow chart for explaining a process routine executed by the control device, i.e., a process routine executed when it is predicted that self-excited vibration occurs in a differential pressure control valve configuring a second hydraulic pressure circuit.

FIGS. 8A to 8C are timing charts obtained when self-excited vibration occurs in the differential pressure control valve configuring the first hydraulic pressure circuit, in which FIG. 8A shows transitions of a vehicle speed of a vehicle and a wheel speed of a wheel, FIG. 8B shows a transition of a hydraulic pressure, and FIG. 8C shows a transition of the indicator differential pressure current value for the differential pressure control valve in the first hydraulic pressure circuit.

FIGS. 9A to 9E are timing charts obtained when self-excited vibration occurs in both the differential pressure control valve configuring the first hydraulic pressure circuit and the differential pressure control valve configuring the second hydraulic pressure circuit, in which FIG. 9A shows transitions of a vehicle speed of a vehicle and a wheel speed of a wheel, FIG. 9B shows a transition of a hydraulic pressure, FIG. 9C shows a transition of an indicator current value for a retention valve of the first hydraulic pressure circuit, FIG. 9D shows a transition of an indicator differential pressure current value for the differential pressure control valve of the first hydraulic pressure circuit, and FIG. 9E shows a transition of an indicator differential pressure current value for the differential pressure control valve of the second hydraulic pressure circuit.

DESCRIPTION OF EMBODIMENTS

An embodiment obtained by embodying a hydraulic control device for vehicles will be described below with reference to FIGS. 1 to 9E.

Figure 1:
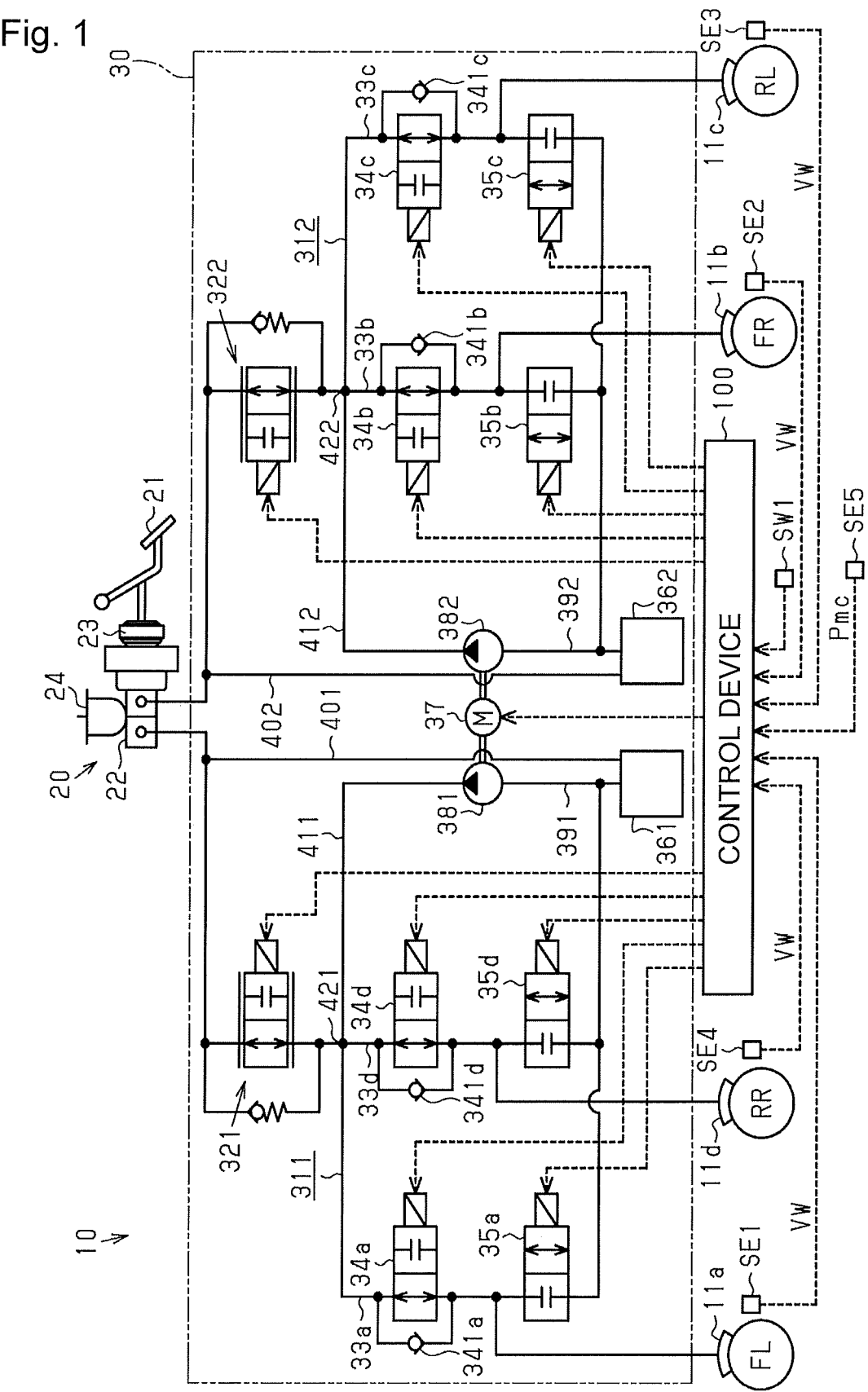
FIG. 1 is a block diagram showing an outline of a brake device for vehicle that is an embodiment of a hydraulic control device for vehicles.

As shown in FIG. 1, in a vehicle including a brake device 10 for vehicle that is a hydraulic control device for vehicles according to the present embodiment, a plurality of wheels FL, FR, RL, and RR and a plurality of wheel cylinders 11a, 11b, 11c, and 11d corresponding to wheels FL, FR, RL, and RR, respectively. The wheel cylinders 11a to 11d correspond to an example of a "control target". A brake fluid is supplied from the brake device 10 to the wheel cylinders 11a to 11d to increase hydraulic pressures in the wheel cylinders 11a to 11d. As a result, brake forces depending on the hydraulic pressures in the wheel cylinders 11a to 11d are applied to the wheels FL, FR, RL, and RR, respectively.

The hydraulic pressures in the wheel cylinders 11a to 11d are also called "WC pressures Pwc". The WC pressure Pwc in the wheel cylinder 11a for the front left wheel may be called a "WC pressure Pwcfl of the front left wheel", and the WC pressure Pwc in the wheel cylinder 11b for the front right wheel may be called a "WC pressure Pwcfr of the front right wheel". Similarly, the WC pressure Pwc in the wheel cylinder 11c for the rear left wheel may be called a "WC pressure Pwcrl of the rear left wheel", and the WC pressure Pwc in the wheel cylinder 11d for the rear right wheel may be called a "WC pressure Pwcrr of the rear right wheel".

The brake device 10 includes a hydraulic pressure generating device 20 generating a hydraulic pressure depending on operation force of a brake pedal 21 operated by a driver, and a brake actuator 30 that can individually adjust the WC pressures Pwc in the wheel cylinders 11a to 11d. In this specification, the brake pedal 21 corresponds to an example of a "brake operation member". To operate the brake pedal 21 by a driver may be called a "brake operation", and operation force of the brake pedal 21 may also be called a "brake operation force".

The hydraulic pressure generating device 20 includes a master cylinder 22, a vacuum booster 23 assisting brake operation force input to the brake pedal 21, and an atmospheric pressure reservoir 24 in which brake fluid is trapped. The brake operation force is input to the master cylinder 22 through the vacuum booster 23. At this time, in the master cylinder 22, a hydraulic pressure depending on the brake operation force that has been input is generated. The hydraulic pressure in the master cylinder 22 is also called an "MC pressure".

In the brake actuator 30, two lines of hydraulic pressure circuits 311 and 312 are disposed. The hydraulic pressure circuits 311 and 312 are connected to the master cylinder 22, so that the brake fluid flows from the master cylinder 22 into the hydraulic pressure circuits 311 and 312 when an MC pressure in the master cylinder 22 increases. The wheel cylinder 11a for the front left wheel and the wheel cylinder 11d for the rear right wheel are connected to a first hydraulic pressure circuit 311, and the wheel cylinder 11b for the front right wheel and the wheel cylinder 11c for the rear left wheel are connected to a second hydraulic pressure circuit 312. When the brake fluid flows from the hydraulic pressure generating device 20 into the hydraulic pressure circuits 311 and 312, the brake fluid is supplied into the wheel cylinders 11a to 11d.

In fluid passages connecting the master cylinder 22 to the wheel cylinders 11a to 11d, differential pressure control valves 321 and 322 that are linear electromagnetic valves are disposed. In the first hydraulic pressure circuit 311, on a wheel cylinder 11a side of the differential pressure control valve 321 and on a wheel cylinder 11d side of the differential pressure control valve 321, a path 33a for the front left wheel and a path 33d for the rear right wheel are disposed. Similarly, in the second hydraulic pressure circuit 312, on a wheel cylinder 11b side of the differential pressure control valve 322 and on a wheel cylinder 11c side of the differential pressure control valve 322, a path 33b for the front right wheel and a path 33c for the rear left wheel are disposed. On the paths 33a to 33d, retention valves 34a, 34b, 34c, and 34d that are normally-opened type electromagnetic valves actuated when increases in WC pressure in the wheel cylinders 11a to 11d are regulated and pressure reducing valves 35a, 35b, 35c, and 35d that are normally-closed type electromagnetic valves actuated when the WC pressures are reduced are disposed. In the hydraulic control device for vehicles according to the present embodiment, the retention valves 34a to 34d configure an example of a "pressure adjusting unit" connected to the differential pressure control valves 321 and 322 through the fluid passages.

On the brake actuator 30, check valves 341a, 341b, 341c, and 341d are arranged in parallel with the retention valves 34a to 34d. The check valves 341a to 341d are configured such that the brake fluid is allowed to move from the wheel cylinders 11a to 11d side to the differential pressure control valves 321 and 322 side and the brake fluid is prohibited from moving from the differential pressure control valves 321 and 322 side to the wheel cylinders 11a to 11d side.

To the first and second hydraulic pressure circuits 311 and 312, reservoirs 361 and 362 temporarily reserving brake fluid flowing from the wheel cylinders 11a to 11d through the pressure reducing valves 35a to 35d, and supply pumps 381 and 382 configuring a part of a hydraulic pressure adjusting unit actuated based on driving of a motor 37 are connected. The reservoirs 361 and 362 are connected to the supply pumps 381 and 382 through intake flow paths 391 and 392 and connected to the fluid passage on the master cylinder 22 side of the differential pressure control valves 321 and 322 through master-side flow paths 401 and 402. The supply pumps 381 and 382 are connected to connection portions 421 and 422 between the differential pressure control valves 321 and 322 and the retention valves 34a to 34d through supply flow paths 411 and 412.

The supply pumps 381 and 382, when the motor 37 drives, draw brake fluid from the insides of the reservoirs 361 and 362 and the master cylinder 22 through the intake flow paths 391 and 392 and the master-side flow paths 401 and 402 and discharge (pump) the brake fluid into the supply flow paths 411 and 412. More specifically, when the differential pressure control valves 321 and 322 and the supply pumps 381 and 382 actuate, a hydraulic pressure in the fluid passage on the wheel cylinders 11a to 11d sides of the differential pressure control valves 321 and 322 becomes higher than a hydraulic pressure in the fluid passage on the master cylinder 22 side of the differential pressure control valves 321 and 322. A differential pressure between the fluid passages on both sides sandwiching the differential pressure control valves 321 and 322 is also called a "first differential pressure", and the first differential pressure becomes higher when the degrees of opening of the differential pressure control valves 321 and 322 become larger. At this time, when the retention valves 34a to 34d do not actuate, i.e., when the retention valves 34a to 34d are fully open, the WC pressures Pwc in the wheel cylinders 11a to 11d are hydraulic pressures substantially equal to a sum of the MC pressure in the master cylinder 22 and the first differential pressure.

On the other hand, when the retention valves 34a to 34d actuate, a hydraulic pressure in the fluid passage on wheel cylinders 11a to 11d sides of the retention valves 34a to 34d is equal to or lower than a hydraulic pressure in the fluid passage on the differential pressure control valves 321 and 322 sides of the retention valves 34a to 34d. Accordingly, when a differential pressure between both the fluid passages sandwiching the retention valves 34a to 34d is called a "second differential pressure", the WC pressures Pwc in the wheel cylinders 11a to 11d is substantially equal to a difference obtained by subtracting the second differential pressure from the sum of the MC pressure in the master cylinder 22 and the first differential pressure. The second differential pressure increases when the degrees of opening of the retention valves 34a to 34d become lower.

As shown in FIG. 1, in the vehicle including the brake device 10, a brake switch SW1, wheel speed sensors SE1, SE2, SE3, and SE4 the number of which is equal to the number of wheels FL, FR, RL, and RR, and a pressure sensor SE5 are disposed. The brake switch SW1 detects whether the brake pedal 21 is operated. The wheel speed sensors SE1 to SE4 detect wheel speeds VW of the corresponding wheels FL, FR, RL, and RR. The pressure sensor SE5 detects an MC pressure Pmc in the master cylinder 22. The information detected by the detection systems is input to a control device 100 that is an example of a control unit.

The control device 100 includes a microcomputer, the various valves 321, 322, 34a to 34d, and 35a to 35d, and a drive circuit to drive the motor 37. The control device 100 controls the brake actuator 30, i.e., the motor 37 and the various valves 321, 322, 34a to 34d, and 35a to 35d based on the information input from the detection systems. The control device 100 performs pulse width modulation (PWM) control to the valves 321, 322, 34a to 34d, and 35a to 35d. Accordingly, the control device 100 is configured to output a pulse-like control signal to a valve to be controlled.

The configuration of the differential pressure control valves 321 and 322 will be described below with reference to FIG. 2.

Figure 2:
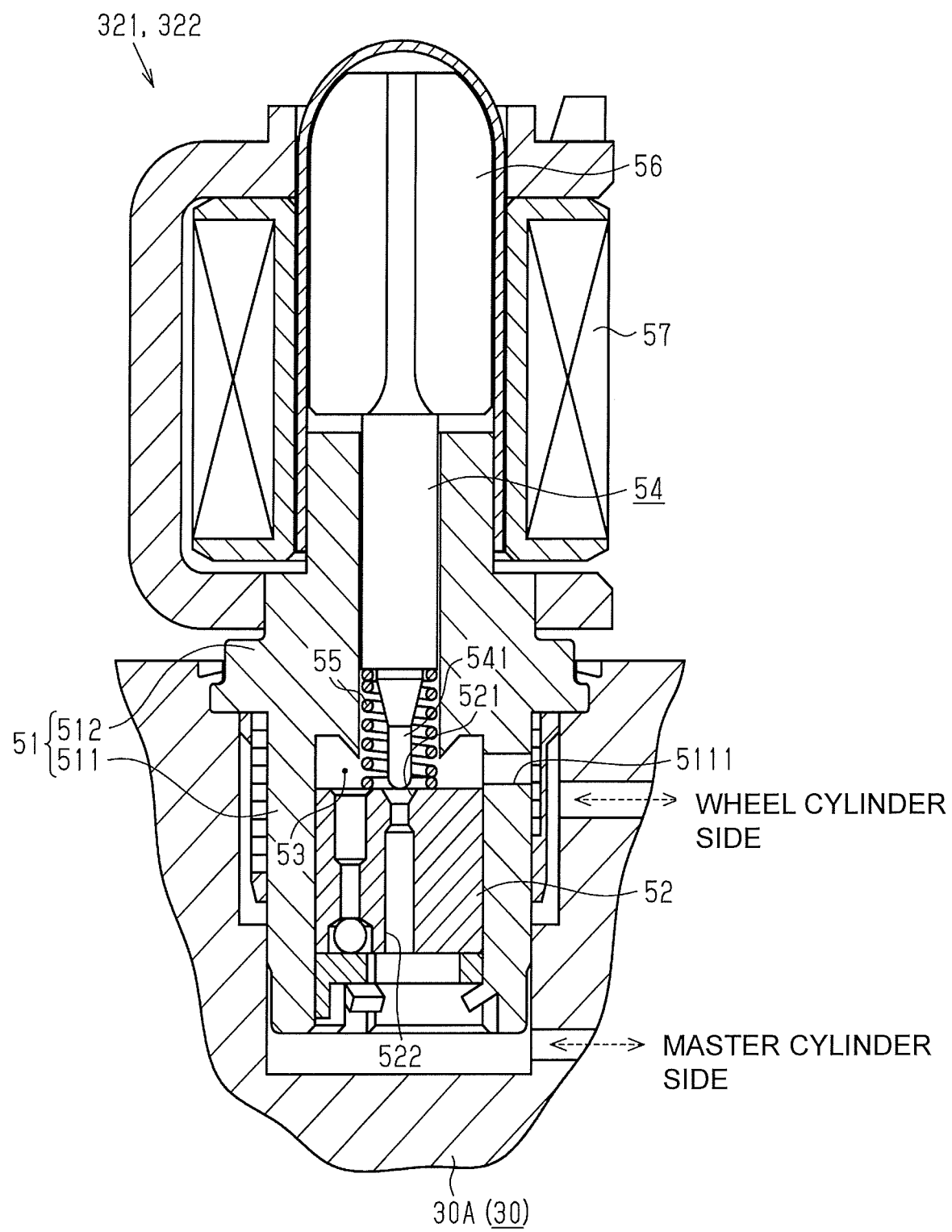
FIG. 2 is a sectional view showing a differential pressure control valve configuring the brake device for vehicle.

As shown in FIG. 2, the differential pressure control valves 321 and 322 are attached to a housing 30A of the brake actuator 30, and include a guide 51 having a substantially cylindrical shape and extending in an axial direction that is a vertical direction in FIG. 2. The guide 51 includes a proximal end portion 511 having a larger diameter of an inner circumference, and a distal end portion 512 located on the upper side of the proximal end portion 511 in the FIG. 2 and a smaller diameter of an inner circumference. In the proximal end portion 511 of the guide 51, a sheet 52 is disposed in a press fitting state. Inside of the guide 51, a valve chest 53 is foil led between an upper end of the sheet 52 in FIG. 2 and a boundary between the proximal end portion 511 and the distal end portion 512.

The sheet 52 includes a valve seat 521 formed at a portion facing the valve chest 53, and an inflow path 522 extending from the valve seat 521 in an axial direction (more specifically, a downward direction in FIG. 2). The inflow path 522 communicates with the master cylinder 22. Accordingly, circulation of the brake fluid between the inside of the valve chest 53 and the inside of the master cylinder 22 is performed through the inflow path 522.

On a peripheral wall of the proximal end portion 511 of the sheet 52, an outflow path 5111 communicating with the inside of the valve chest 53 is disposed. The outflow path 5111 communicates with the wheel cylinders 11a to 11d. Accordingly, outflow of the brake fluid from the inside of the valve chest 53 to the wheel cylinders 11a to 11d and an inflow of the brake fluid from the wheel cylinders 11a to 11d to the inside of the valve chest 53 are performed through the outflow path 5111.

The differential pressure control valves 321 and 322 each include a valve element 54 moving inside the distal end portion 512 of the guide 51 in a direction approaching the valve seat 521 and in a direction away from the valve seat 521. A distal end 541 that is a lower end of the valve element 54 in FIG. 2 can sit on the valve seat 521 of the sheet 52. When the valve element 54 sits on the valve seat 521, the opening of the inflow path 522 open to the valve seat 521 is closed by the valve element 54, so that the communication between the inside of the valve chest 53 and the inside of the master cylinder 22 is blocked. The valve element 54 is biased by a coil spring 55 in a direction away from the valve seat 521 (more specifically, in an upward direction in FIG. 2).

On the differential pressure control valves 321 and 322, a plunger 56 fixed to a proximal end (more specifically, an upper end in FIG. 2) of the valve element 54, and a solenoid 57 located outside in the radial direction of the valve element 54 and the plunger 56. When a control signal from the control device 100 is input to the solenoid 57, a current having a magnitude depending on the control signal flows in the solenoid 57. The current flows in the solenoid 57 to generate electromagnetic force. The electromagnetic force acts in a direction opposite to a biasing direction of the coil spring 55, i.e., a direction in which the valve element 54 and the plunger 56 are pressed downward. Thus, the magnitude of the current flowing in the solenoid 57, i.e., a duty ratio of the control signal, is adjusted to adjust a spacing between the valve element 54 and the valve seat 521, i.e., degrees of opening of the differential pressure control valves 321 and 322.

When the brake fluid is being pumped by the actuation of the supply pumps 381 and 382 and the current flowing in the solenoid 57 is equal to or larger than a closed-valve minimum current value IsmA, the distal end 541 of the valve element 54 sits on the valve seat 521. When the current flowing in the solenoid 57 is equal to or larger than the closed-valve minimum current value IsmA, force pressing the distal end 541 of the valve element 54 against the valve seat 521 increases as the current flowing in the solenoid 57 becomes larger.

In the brake device 10, the degrees of opening of the differential pressure control valves 321 and 322 when the brake fluid is pumped by the actuation of the supply pumps 381 and 382 are adjusted to adjust the first differential pressure that is a differential pressure between a flow path on a master cylinder 22 side of the differential pressure control valves 321 and 322 and a flow path on a wheel cylinders 11a to 11d side of the differential pressure control valves 321 and 322. More specifically, both the differential pressure control valves 321 and 322 and the supply pumps 381 and 382 are actuated to adjust an inflow of the brake fluid into the control target, i.e., the WC pressures Pwc in the wheel cylinders 11a to 11d.

When the differential pressure control valves 321 and 322 and the supply pumps 381 and 382 are actuated, the degrees of opening of the retention valves 34a to 34d may also be adjusted. The retention valves 34a to 34d are also actuated as described above to individually adjust the WC pressures Pwc in the wheel cylinders 11a to 11d. When the retention valves 34a to 34d are also actuated, the valve element 54 may swing within the differential pressure control valves 321 and 322 in its axial direction, namely, self-excited vibration may occur.

As shown in FIG. 2, the position of the valve element 54 in an axial direction, i.e., the degrees of opening of the differential pressure control valves 321 and 322 are determined depending on a relationship between the electromagnetic force generated by flowing of current in the solenoid 57, the biasing force acting from the coil spring 55 to the valve element 54, and the pressure in the valve chest 53 communicating with the outflow path 5111. Since the pumping of the brake fluid from the supply pumps 381 and 382 continues when the degrees of opening of the retention valves 34a to 34d are changed, intermediate hydraulic pressures PM that are hydraulic pressures in the fluid passages connecting the retention valves 34a to 34d to the differential pressure control valves 321 and 322. Since the fluid passages communicate with the inside of the valve chest 53 through the outflow path 5111, the hydraulic pressure in the valve chest 53 changes by the change of the intermediate hydraulic pressure PM. As a result, the magnitude of the current flowing in the solenoid 57 is constant, and electromagnetic forces generated in the differential pressure control valves 321 and 322 do not change. Accordingly, the above relationship breaks up to cause the valve element 54 to swing in the axial direction, so that self-excited vibration occurs in the differential pressure control valves 321 and 322.

When the self-excited vibration occurs in the differential pressure control valves 321 and 322, a variation in hydraulic pressure, vibration, and abnormal noise, and the like caused by the self-excited vibration may be generated.

In the hydraulic control device for vehicles according to the present embodiment, when predetermined suppression control permission conditions (which will be described later in detail) are satisfied, a self-excited vibration suppression control that brings the valve element 54 separated from the valve seat 521 into contact with the valve seat 521 and separates the valve element 54 from the valve seat 521 immediately after the valve element 54 is brought into contact with the valve seat 521 is executed. With the execution of the self-excited vibration suppression control, the electromagnetic force presses the valve element 54 against the valve seat 521 to suppress the self-excited vibration of the valve element 54. As a result, the self-excited vibration suppression control is executed when the self-excited vibration occurs in the differential pressure control valves 321 and 322 to prevent abnormal noise caused by the self-excited vibration from being generated from the brake device 10.

Amplitude of the self-excited vibration occurring in the differential pressure control valves 321 and 322 easily becomes larger when change rates of the degrees of opening of the retention valves 34a to 34d are higher. This is because, when the change rates of the degrees of opening of the retention valves 34a to 34d are higher, a change rate of the intermediate hydraulic pressure PM, i.e., the hydraulic pressure in the valve chest 53 becomes higher, and the relationship breaks largely.

The inside of the valve chests 53 of the differential pressure control valves 321 and 322 communicate with the inside of the master cylinder 22 through the inflow path 522. Accordingly, the hydraulic pressure in the valve chest 53 also changes depending on a change in the MC pressure in the master cylinder 22. Although the change rate of the MC pressure depends on the change rate of the brake operation force applied by the driver, the change rate of the hydraulic pressure in the valve chest 53 caused by the change rate of the brake operation force is lower than that caused by the change of the degrees of opening of the retention valves 34a to 34d. Accordingly, self-excited vibration in the differential pressure control valves 321 and 322 caused by the change in MC pressure does not easily occur.

Next, a process routine executed by the control device 100 when a driver operates the brake pedal 21 will be described below with reference to the flow chart shown in FIG. 3. The process routine is executed for each preset control cycle.

As shown in FIG. 3, in this process routine, the control device 100 determines whether the WC pressures in the wheel cylinders 11a to 11d are being adjusted by actuating both the differential pressure control valves 321 and 322 and the supply pumps 381 and 382 (step S11). The WC pressures in the wheel cylinders 11a to 11d are adjusted by actuating both the differential pressure control valves 321 and 322 and the supply pumps 381 and 382, when, for example, brake assist that assists a brake operation by the driver is executed.

When at least one of the differential pressure control valves 321 and 322 and at least one of the supply pumps 381 and 382 are not actuated (step S11: NO), the control device 100 temporarily ends the process routine. On the other hand, when both the differential pressure control valves 321 and 322 and the supply pumps 381 and 382 are actuated (step S11: YES), the control device 100 acquires the WC pressures Pwc (Pwcfl, Pwcfr, Pwcrl, and Pwcrr) in the wheel cylinders 11a to 11d (step S12). The WC pressures Pwc is calculated by using a relational expression (equation 1) below. In the relational expression (equation 1), "Pmc" is the MC pressure in the master cylinder 22 detected by the pressure sensor SE5. "PSA" is an indicator differential pressure for the differential pressure control valves 321 and 322, and the first differential pressure that is the differential pressure between the fluid passage on the master cylinder 22 side of the differential pressure control valves 321 and 322 and the fluid passage on the wheel cylinders 11a to 11d side of the differential pressure control valves 321 and 322 is substantially equal to the indicator differential pressure PSA. "PSB" is an indicator differential pressure for the retention valves 34a to 34d, and the second differential pressure that is the differential pressure between the fluid passage on the differential pressure control valves 321 and 322 side of the retention valves 34a to 34d and the fluid passage on the wheel cylinders 11a to 11d side of the retention valves 34a to 34d, is substantially equal to the indicator differential pressure PSB.

$$Pwc=Pmc+PSA-PSB \qquad \text{Equation 1:}$$

Subsequently, the control device 100 acquires an indicator current value Ino that is a command value of the current flowing in the solenoid of each of the retention valves 34a to 34d (step S13). The indicator current value Ino correlates with the indicator differential pressure PSB for the retention valves 34a to 34d and becomes larger when the indicator differential pressure PSB is larger. More specifically, the magnitudes of currents flowing in the retention valves 34a to 34d correlate with the degrees of opening of the retention valves 34a to 34d.

The control device 100 calculates a change rate VIno of the indicator current value for each of the retention valves 34a to 34d (step S14). The change rate VIno of the indicator current value correlates with the change rates of the degrees of opening of the retention valves 34a to 34d. More specifically, when the degrees of opening of the retention valves 34a to 34d decrease, the change rate VIno increases when decrease rates of the degrees of opening of the retention valves 34a to 34d are higher. When the degrees of opening of the retention valves 34a to 34d increase, the change rate VIno increases when increase rates of the degrees of opening of the retention valves 34a to 34d are higher. Subsequently, the control device 100 determines whether the retention valves 34a to 34d include a retention valve in which the change rate VIno of the indicator current value is equal to or higher than a determination change rate VInoTH1 (step S15). One of the suppression control permission conditions is that the retention valves 34a to 34d include a retention valve in which the change rate VIno of the indicator current value is equal to or higher than the determination change rate VInoTH1.

When the change rate VIno of the indicator current value is lower than the determination change rate VInoTH1, it can be predicted that no self-excited vibration occurs in the differential pressure control valves 321 and 322, or even if the self-excited vibration occurs, the amplitude of the self-excited vibration is very small. In other words, when the change rate VIno of the indicator current value is equal to or higher than the determination change rate VInoTH1, it can be predicted that self-excited vibration occurs in the differential pressure control valves 321 and 322. Accordingly, when the retention valves 34a to 34d do not include a retention valve in which the change rate VIno of the indicator current value is equal to or higher than the determination change rate VInoTH1 (step S15: NO), the control device 100 temporarily ends the process routine without executing the self-excited vibration suppression control.

On the other hand, when the retention valves 34a to 34d include the retention valve in which the change rate VIno of the indicator current value is equal to or higher than a determination change rate VInoTH1 (step S15: YES), the control device 100 determines whether the retention valve is a retention valve configuring the first hydraulic pressure circuit 311 (step S16). When the retention valve is the retention valve configuring the first hydraulic pressure circuit 311, the control device 100 can predict that the self-excited vibration occurs in the differential pressure control valve 321 of the first hydraulic pressure circuit 311. On the other hand, when the retention valve is the retention valve configuring the second hydraulic pressure circuit 312, the control device 100 can predict that the self-excited vibration occurs in the differential pressure control valve 322 of the second hydraulic pressure circuit 312.

Accordingly, when the retention valve in which the change rate VIno of the indicator current value is equal to or higher than the determination change rate VInoTH1 configures the first hydraulic pressure circuit 311 (step S16: YES), the control device 100 executes a first process (step S17), which will be described later by using FIG. 4, and temporarily ends the process routine. On the other hand, the retention valve in which the change rate VIno of the indicator current value is equal to or higher than the determination change rate VInoTH1 is the retention valve configuring the second hydraulic pressure circuit 312 (step S16: NO), the control device 100 executes a second process (step S18), which will be described later by using FIG. 5, and temporarily ends the process routine.

Next, the first process (first process routine) of step S17 will be described below with reference to a flow chart shown in FIG. 4.

As shown in FIG. 4, in the process routine, the control device 100 determines whether both the retention valves 34a and 34d configuring the first hydraulic pressure circuit 311 are closed (step S21). One of the suppression control permission conditions is that at least one retention valve of both the retention valves 34a and 34d is not closed. Whether the retention valve is closed can be determined based on the indicator current value Ino for the retention valve. When the self-excited vibration suppression control is executed to the differential pressure control valve 321, the differential pressure control valve 321 is temporarily closed. When the differential pressure control valve 321 is closed when both the retention valves 34a and 34d are closed, since the pumping of the brake fluid from the supply pump 381 is continued, the intermediate hydraulic pressure PM that is a pressure in the fluid passage connecting the differential pressure control valve 321 to the retention valves 34a and 34d may become excessively higher.

Accordingly, when both the retention valves 34a and 34d are closed (step S21: YES), the control device 100 prohibits the self-excited vibration suppression control from being executed to the differential pressure control valve 321 configuring the first hydraulic pressure circuit 311 (step S22). The control device 100 shifts the process to step S25 (which will be described later). On the other hand, when at least one retention valve of the retention valves 34a and 34d is not closed (step S21: NO), the control device 100 shifts the process to the next step S23.

In step S23, the control device 100 calculates an eleventh intermediate hydraulic pressure PMfl that is a sum of the WC pressure Pwcfl of the front left wheel and an indicator differential pressure PSBfl for the retention valve 34a for the front left wheel. The eleventh intermediate hydraulic pressure PMfl is a calculated value of an intermediate hydraulic pressure that is the hydraulic pressure in the fluid passage connecting the differential pressure control valve 321 to both the retention valves 34a and 34d on the assumption that the retention valve 34d for the rear right wheel is closed. Subsequently, the control device 100 derives a hydraulic-pressure rising value Pupfl that is an increment of the intermediate hydraulic pressure generated by the execution of the self-excited vibration suppression control to calculate an eleventh intermediate hydraulic pressure prediction value PMEfl that is a sum of the eleventh intermediate hydraulic pressure PMfl and the hydraulic-pressure rising value Pupfl.

In step S23, the control device 100 calculates a twelfth intermediate hydraulic pressure PMrr that is a sum of the WC pressure Pwcrr of the rear right wheel and an indicator differential pressure PSBrr for the retention valve 34d for the rear right wheel. The twelfth intermediate hydraulic pressure PMrr is a calculated value of an intermediate hydraulic pressure that is the hydraulic pressure in the fluid passage connecting the differential pressure control valve 321 to both the retention valves 34a and 34d on the assumption that the retention valve 34a for the front left wheel is closed. Subsequently, the control device 100 derives a hydraulic-pressure rising value Puprr that is an increment of the intermediate hydraulic pressure generated by the execution of the self-excited vibration suppression control to calculate a twelfth intermediate hydraulic pressure prediction value PMErr that is a sum of the twelfth intermediate hydraulic pressure PMrr and the hydraulic-pressure rising value Puprr. The hydraulic-pressure rising values Pupfl and Puprr can be calculated based on, for example, indicator current values (i.e., degrees of opening) for the retention valves 34a and 34d, a closing time of the differential pressure control valve 321 with the execution of the self-excited vibration suppression control, and the like.

In step S23, the control device 100 determines whether both a condition in which the eleventh intermediate hydraulic pressure prediction value PMEfl exceeds a system upper-limit pressure Pmax and a condition in which the twelfth intermediate hydraulic pressure prediction value PMErr exceeds the system upper-limit pressure Pmax are satisfied. The system upper-limit pressure Pmax is a hydraulic pressure set to protect the fluid passage connecting the differential pressure control valve 321 to the retention valves 34a and 34d, and a determination value to determine whether the intermediate hydraulic pressure PM that is the hydraulic pressure in the fluid passage is excessive when the self-excited vibration suppression control is executed in this situation. More specifically, in step S23, when both the differential pressure control valve 321 and the supply pump 381 are actuated to adjust the WC pressures in the wheel cylinders 11a and 11d, it is predicted whether the intermediate hydraulic pressure in the fluid passage connecting the differential pressure control valve 321 to the retention valves 34a and 34d is equal to or smaller than the system upper-limit pressure Pmax when the differential pressure control valve 321 is closed in this situation. One of predetermined suppression control permission conditions is that the intermediate hydraulic pressure is predicted to be equal to or smaller than the system upper-limit pressure Pmax.

When both the eleventh intermediate hydraulic pressure prediction value PMEfl and the twelfth intermediate hydraulic pressure prediction value PMErr exceed the system upper-limit pressure Pmax (step S23: YES), the control device 100 shifts the process to step S22 described above. On the other hand, when at least one of the eleventh intermediate hydraulic pressure prediction value PMEfl and the twelfth intermediate hydraulic pressure prediction value PMErr is equal to or smaller than the system upper-limit pressure Pmax (step S23: NO), since all the suppression control permission conditions are satisfied, the control device 100 permits the self-excited vibration suppression control to be executed to the differential pressure control valve 321 configuring the first hydraulic pressure circuit 311 (step S24). The control device 100 shifts the process to the next step S25.

In step S25, the control device 100 calculates the change rates VIno of the indicator current values for both the retention valves 34a and 34d to determine whether the retention valves 34a and 34d include a retention valve in which the change rate VIno of the indicator current value is equal to or higher than the other execution determination rate VInoTH2. The other execution determination rate VInoTH2 is set to be larger than the determination change rate VInoTH1. Accordingly, when the retention valves include a retention valve in which the change rate VIno of the indicator current value is equal to or higher than the other execution determination rate VInoTH2, it can be predicted that the amplitude of self-excited vibration in the differential pressure control valve 321 of the first hydraulic pressure circuit 311 is large, the self-excited vibration of the differential pressure control valve 321 is transmitted to the differential pressure control valve 322 of the second hydraulic pressure circuit 312, and the self-excited vibration also occurs in the differential pressure control valve 322. On the other hand, when the retention valves do not include a retention valve in which the change rate VIno of the indicator current value is equal to or higher than the other execution determination rate VInoTH2, it can be predicted that the amplitude of self-excited vibration in the differential pressure control valve 321 of the first hydraulic pressure circuit 311 is small, and the self-excited vibration of the differential pressure control valve 321 is not transmitted to the differential pressure control valve 322 of the second hydraulic pressure circuit 312.

Accordingly, when the retention valves 34a and 34d include a retention valve in which the change rate VIno of the indicator current value is equal to or higher than the other execution determination rate VInoTH2 (step S25: YES), the control device 100 permits the self-excited vibration suppression control to be executed to the differential pressure control valve 322 of the second hydraulic pressure circuit 312 (step S26). Thereafter, the control device 100 ends the process routine. On the other hand, when the retention valves 34a and 34d do not include a retention valve in which the change rate VIno of the indicator current value is equal to or higher than the other execution determination rate VInoTH2 (step S25: NO), the control device 100 ends the process routine without permitting the self-excited vibration suppression control to be executed to the differential pressure control valve 322 of the second hydraulic pressure circuit 312.

Figure 6:
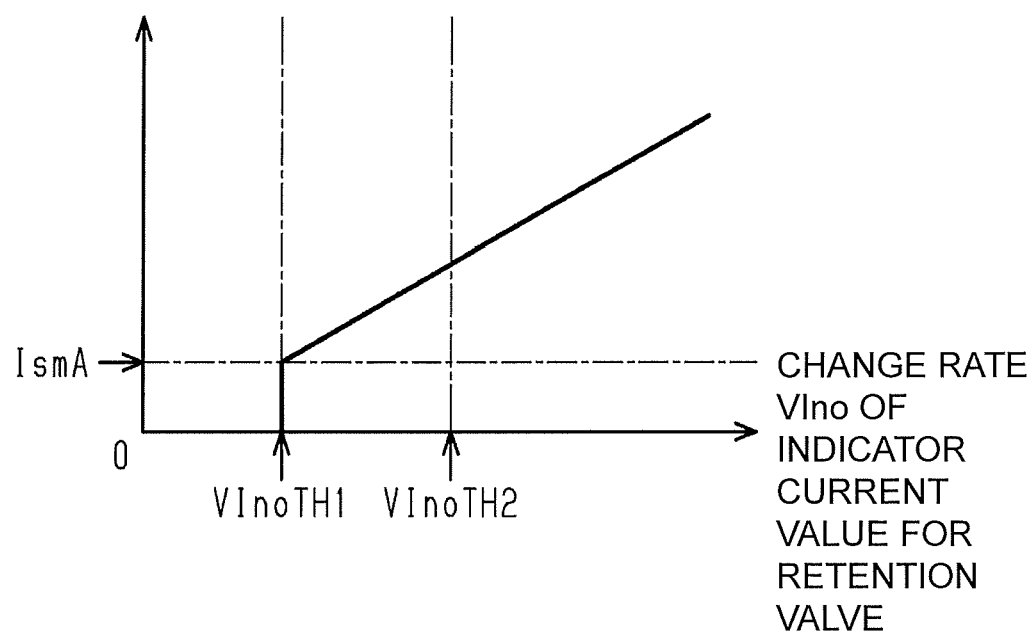
FIG. 6 is a map to determine an indicator differential pressure current value for a differential pressure control valve in which self-excited vibration caused by actuation of a retention valve connected through a fluid passage occurs.

When all the predetermined suppression control permission conditions are satisfied to execute the self-excited vibration suppression control on the differential pressure control valve 321, the control device 100 sets an indicator differential pressure current value Ism for the differential pressure control valve 321 with reference to a map shown in FIG. 6. The map shown in FIG. 6 shows a relationship between the change rate VIno of the indicator current value for the retention valve serving as a factor causing the self-excited vibration and the indicator differential pressure current value Ism for the differential pressure control valve. More specifically, when the change rate VIno is lower than the determination change rate VInoTH1, since the self-excited vibration suppression control does not need to be executed, the indicator differential pressure current value Ism for the differential pressure control valve 321 is "0 (zero)". On the other hand, when the change rate VIno is equal to or higher than the determination change rate VInoTH1, the indicator differential pressure current value Ism for the differential pressure control valve 321 is set to be equal to or larger than the closed-valve minimum current value IsmA. More specifically, when the change rate VIno is equal to the determination change rate VInoTH1, the indicator differential pressure current value Ism for the differential pressure control valve 321 is set to be equal to the closed-valve minimum current value IsmA. When the change rate VIno is higher than the determination change rate VInoTH1, the indicator differential pressure current value Ism for the differential pressure control valve 321 becomes larger when the change rate VIno is larger.

Figure 7:
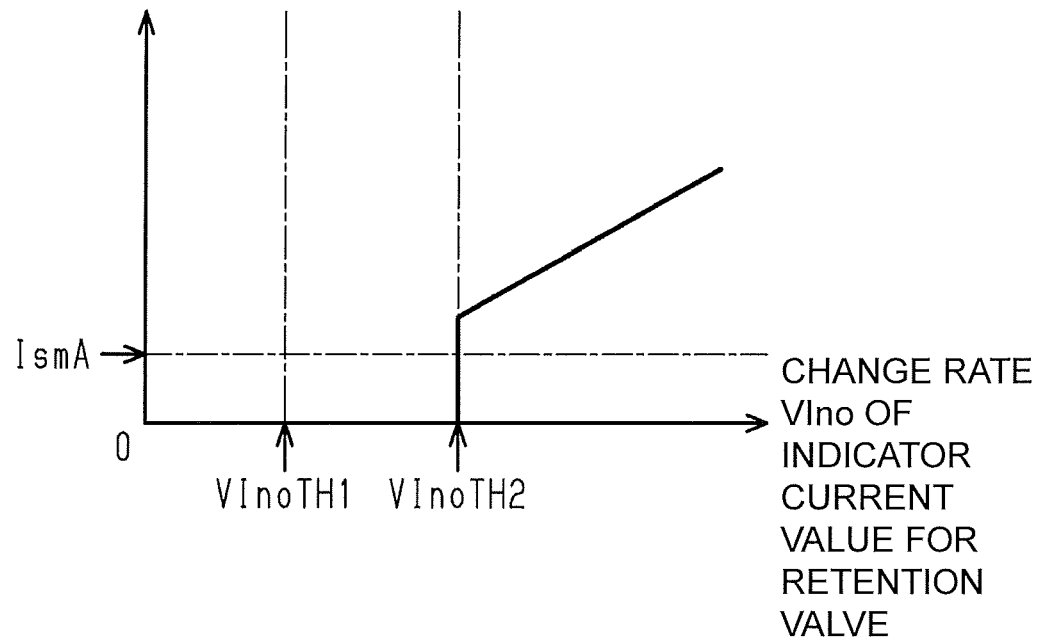
FIG. 7 is a map to determine an indicator differential pressure current value for a differential pressure control valve in which self-excited vibration caused by self-excited vibration occurring in another differential pressure control valve occurs.

On the other hand, when it is predicted that self-excited vibration also occurs in the differential pressure control valve 322 of the second hydraulic pressure circuit 312 due to the occurrence of self-excited vibration in the differential pressure control valve 321 to also execute the self-excited vibration suppression control on the differential pressure control valve 322, the control device 100 sets the indicator differential pressure current value Ism for the differential pressure control valve 322 with reference to a map shown in FIG. 7. The map shown in FIG. 7 shows a relationship between the change rate VIno of the indicator current value for the retention valve serving as a factor causing the self-excited vibration and the indicator differential pressure current value Ism for the differential pressure control valve. More specifically, when the change rate VIno is lower than the other execution determination rate VInoTH2, since the self-excited vibration suppression control does not need to be executed, the indicator differential pressure current value Ism for the differential pressure control valve 322 is "0 (zero)". On the other hand, when the change rate VIno is equal to or higher than the other execution determination rate VInoTH2, the indicator differential pressure current value Ism for the differential pressure control valve 321 is set to be larger than the closed-valve minimum current value IsmA. More specifically, when the change rate VIno is higher, the indicator differential pressure current value Ism for the differential pressure control valve 322 becomes larger.

Next, a second process (a second process routine) of step S18 will be described below with reference to a flow chart shown in FIG. 5.

As shown in FIG. 5, in the process routine, the control device 100 determines whether both the retention valves 34b and 34c configuring the second hydraulic pressure circuit 312 are closed (step S31). One of the predetermined suppression control permission conditions is that at least one retention valve of both the retention valves 34b and 34c is not closed. When the self-excited vibration suppression control is executed to the differential pressure control valve 322, the differential pressure control valve 322 is temporarily closed. When the differential pressure control valve 322 is closed when both the retention valves 34b and 34c are closed, since the pumping of the brake fluid from the supply pump 382 is continued, the intermediate hydraulic pressure PM that is a hydraulic pressure in the fluid passage connecting the differential pressure control valve 322 to the retention valves 34b and 34c may become excessively higher.

Accordingly, when both the retention valves 34b and 34c are closed (step S31: YES), the control device 100 prohibits the self-excited vibration suppression control from being executed to the differential pressure control valve 322 configuring the second hydraulic pressure circuit 312 (step S32). The control device 100 shifts the process to step S35 (which will be described later). On the other hand, when at least one retention valve of the retention valves 34b and 34c is not closed (step S31: NO), the control device 100 shifts the process to the next step S33.

In step S33, the control device 100 calculates a twenty-first intermediate hydraulic pressure PMfr that is a sum of the WC pressure Pwcfr of the front right wheel and an indicator differential pressure PSBfr for the retention valve 34b for the front right wheel. The twenty-first intermediate hydraulic pressure PMfr is a calculated value of an intermediate hydraulic pressure that is the hydraulic pressure in the fluid passage connecting the differential pressure control valve 322 to both the retention valves 34b and 34c on the assumption that the retention valve 34c for the rear left wheel is closed. Subsequently, the control device 100 derives a hydraulic-pressure rising value Pupfr that is an increment of the intermediate hydraulic pressure generated by the execution of the self-excited vibration suppression control to calculate a twenty-first intermediate hydraulic pressure prediction value PMEfr that is a sum of the twenty-first intermediate hydraulic pressure PMfr and the hydraulic-pressure rising value Pupfr.

In step S33, the control device 100 calculates a twenty-second intermediate hydraulic pressure PMrl that is a sum of the WC pressure Pwcrl of the rear left wheel and an indicator differential pressure PSBrl for the retention valve 34c for the rear left wheel. The twenty-second intermediate hydraulic pressure PMrl is a calculated value of an intermediate hydraulic pressure that is the hydraulic pressure in the fluid passage connecting the differential pressure control valve 322 to both the retention valves 34b and 34c on the assumption that the retention valve 34b for the front right wheel is closed. Subsequently, the control device 100 derives a hydraulic-pressure rising value Puprl that is an increment of the intermediate hydraulic pressure generated by the execution of the self-excited vibration suppression control to calculate a twenty-second intermediate hydraulic pressure prediction value PMErl that is a sum of the twenty-second intermediate hydraulic pressure PMrl and the hydraulic-pressure rising value Puprl. The hydraulic-pressure rising values Pupfr and Puprl can be calculated based on, for example, indicator current values (i.e., degrees of opening) for the retention valves 34b and 34c, a closing time of the differential pressure control valve 322 with the execution of the self-excited vibration suppression control, and the like.

In step S33, the control device 100 determines whether both a condition in which the twenty-first intermediate hydraulic pressure prediction value PMEfr exceeds the system upper-limit pressure Pmax and a condition in which the twenty-second intermediate hydraulic pressure prediction value PMErl exceeds the system upper-limit pressure Pmax are satisfied. More specifically, in step S33, when both the differential pressure control valve 322 and the supply pump 382 are actuated to adjust the WC pressures in the wheel cylinders 11b and 11c, it is predicted whether the intermediate hydraulic pressure in the fluid passage connecting the differential pressure control valve 322 to the retention valves 34b and 34c is equal to or smaller than the system upper-limit pressure Pmax when the differential pressure control valve 322 is closed in this situation. One of the predetermined suppression control permission conditions is that the intermediate hydraulic pressure is predicted to be equal to or smaller than the system upper-limit pressure Pmax.

When both the twenty-first intermediate hydraulic pressure prediction value PMEfr and the twenty-second intermediate hydraulic pressure prediction value PMErl exceed the system upper-limit pressure Pmax (step S33: YES), the control device 100 shifts the process to step S32 described above. On the other hand, when at least one of the twenty-first intermediate hydraulic pressure prediction value PMEfr and the twenty-second intermediate hydraulic pressure prediction value PMErl is equal to or smaller than the system upper-limit pressure Pmax (step S33: NO), since all the predetermined suppression control permission conditions are satisfied, the control device 100 permits the self-excited vibration suppression control to be executed to the differential pressure control valve 322 configuring the second hydraulic pressure circuit 312 (step S34). The control device 100 shifts the process to the next step S35.

In step S35, the control device 100 calculates the change rates VIno of the indicator current values for both the retention valves 34b and 34c to determine whether the retention valves 34b and 34c include a retention valve in which the change rate VIno of the indicator current value is equal to or higher than the other execution determination rate VInoTH2. When the retention valves include a retention valve in which the change rate VIno of the indicator current value is equal to or higher than the other execution determination rate VInoTH2, it can be predicted that the amplitude of self-excited vibration in the differential pressure control valve 322 of the second hydraulic pressure circuit 312 is large, the self-excited vibration of the differential pressure control valve 322 is transmitted to the differential pressure control valve 321 of the first hydraulic pressure circuit 311, and the self-excited vibration also occurs in the differential pressure control valve 321. On the other hand, when the retention valves do not include a retention valve in which the change rate VIno of the indicator current value is equal to or higher than the other execution determination rate VInoTH2, it can be predicted that the amplitude of self-excited vibration in the differential pressure control valve 322 of the second hydraulic pressure circuit 312 is small, and the self-excited vibration of the differential pressure control valve 322 is not transmitted to the differential pressure control valve 321 of the first hydraulic pressure circuit 311.

Accordingly, when the retention valves 34b and 34c include a retention valve in which the change rate VIno of the indicator current value is equal to or higher than the other execution determination rate VInoTH2 (step S35: YES), the control device 100 permits the self-excited vibration suppression control to be executed to the differential pressure control valve 321 of the first hydraulic pressure circuit 311 (step S36). Thereafter, the control device 100 ends the process routine. On the other hand, when the retention valves 34b and 34c do not include a retention valve in which the change rate VIno of the indicator current value is equal to or higher than the other execution determination rate VInoTH2 (step S35: NO), the control device 100 ends the process routine without permitting the self-excited vibration suppression control to be executed to the differential pressure control valve 321 of the first hydraulic pressure circuit 311.

When all the predetermined suppression control permission conditions are satisfied to execute the self-excited vibration suppression control on the differential pressure control valve 322, the control device 100 sets the indicator differential pressure current value Ism for the differential pressure control valve 322 with reference to the map shown in FIG. 6. On the other hand, when it is predicted that self-excited vibration also occurs in the differential pressure control valve 321 of the first hydraulic pressure circuit 311 due to the occurrence of self-excited vibration in the differential pressure control valve 322 to also execute the self-excited vibration suppression control on the differential pressure control valve 321, the control device 100 sets the indicator differential pressure current value Ism for the differential pressure control valve 321 with reference to the map shown in FIG. 7.

Next, an operation of the hydraulic control device for vehicles according to the present embodiment will be described below together with the effect thereof with reference to a timing chart shown in FIGS. 8A to 8C. In an example shown in FIGS. 8A to 8C, it is assumed that the brake assist is started when a brake operation is performed by a driver and anti-lock brake system control (hereinafter also referred to as "ABS control") is started for the front left wheel FL and the rear right wheel RR. In the present embodiment, it is assumed that the ABS control is not performed to the front right wheel FR and the rear left wheel RL. Furthermore, in this case, for descriptive convenience for understanding of the specification, it is assumed that, on the front left wheel FL and the rear right wheel RR to which the ABS control is performed, reductions and increases of the WC pressures Pwcfl and Pwcrr are started at the same timing.

Figure 8A:
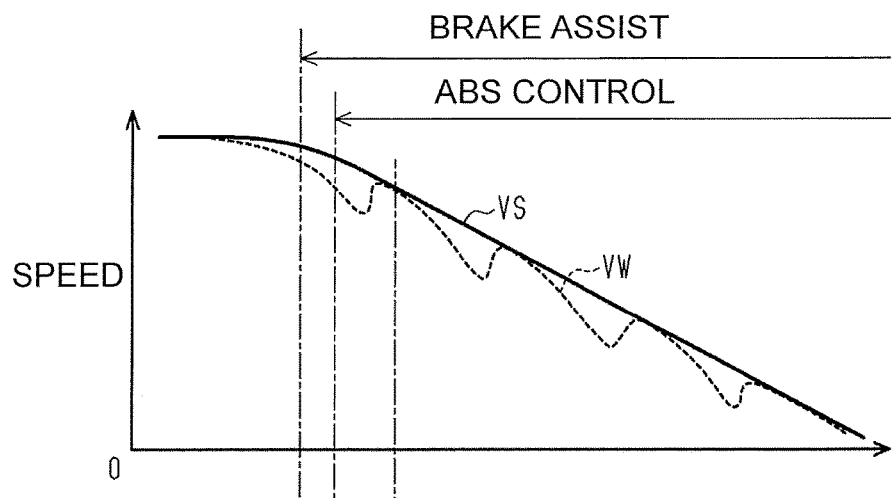
Figure 8B:
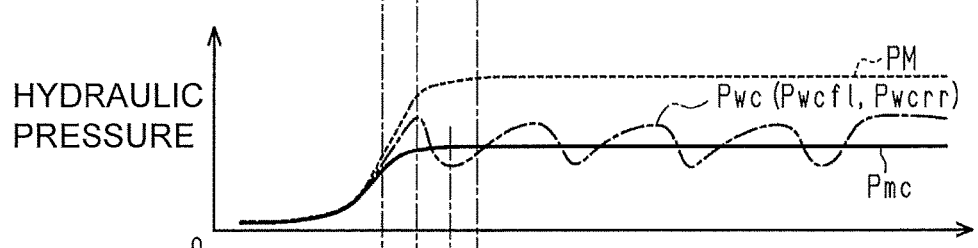
Figure 8C:
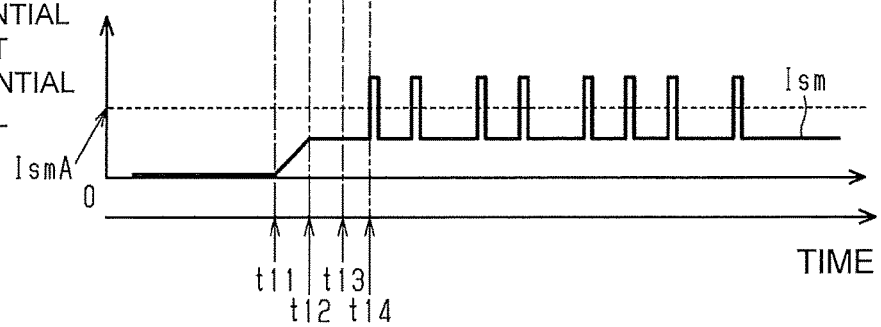
Figure 9A:
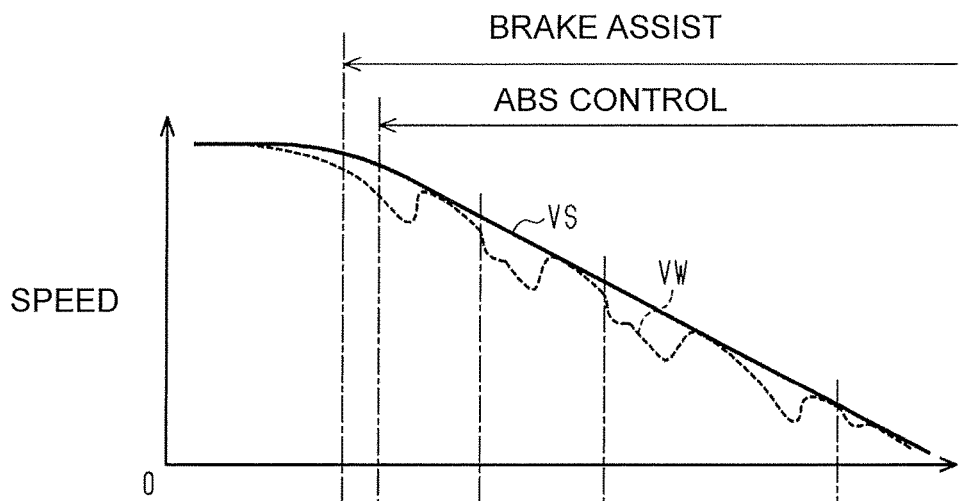
Figure 9B:
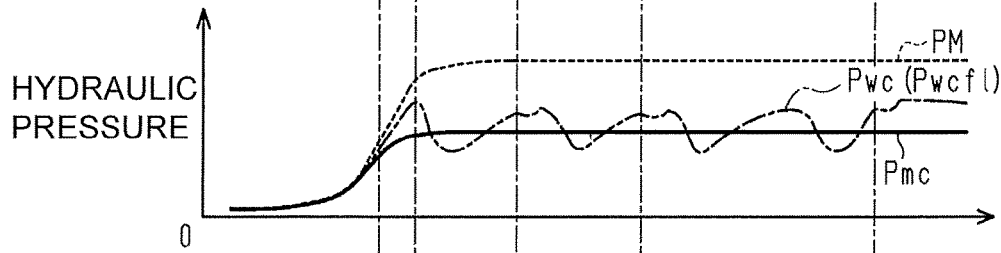
Figure 9C:
Figure 9D:
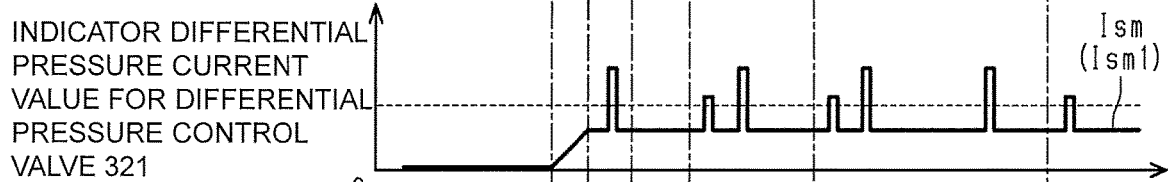
Figure 9E:
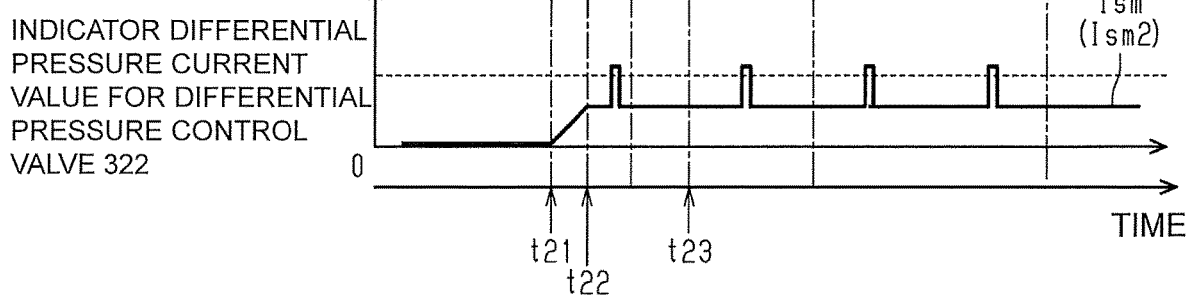

As shown in FIGS. 8A, 8B, and 8C, when a driver starts a brake operation while the vehicle is moving, in accordance with an increase in the MC pressure Pmc in the master cylinder 22, the WC pressures Pwc in the wheel cylinders 11a to 11d are also increased. Accordingly, since brake force applied to each of the wheels FL, FR, RL, and RR increases, the wheel speeds VW of the wheels FL, FR, RL, and RR become lower. A vehicle speed VS of the vehicle calculated based on at least one wheel speed of the wheel speeds VW of the wheels FL, FR, RL, and RR also becomes gradually lower.

At a first timing t11 in the process of brake operation performed by the driver, brake assist is started (step S11: YES). At this time, in the brake actuator 30, both the supply pumps 381 and 382 and the differential pressure control valves 321 and 322 begin to operate. In this state, since the retention valves 34a to 34d do not actuate, the WC pressures Pwc in the wheel cylinders 11a to 11d are substantially equal to a sum of the MC pressure Pmc in the master cylinder 22 and the indicator differential pressure PSA for the differential pressure control valves 321 and 322.

In the example shown in FIGS. 8A to 8C, in a period from the first timing t11 to a second timing t12, the indicator differential pressure PSA for the differential pressure control valves 321 and 322, i.e., the indicator differential pressure current value Ism gradually increases. Accordingly, a differential pressure between the WC pressure Pwc and the MC pressure Pmc gradually increases. After the second timing t12, even in the execution of brake assist, the indicator differential pressure PSA for the differential pressure control valves 321 and 322 are kept at a value at the second timing t12.

At the second timing t12, slip amounts of the front left wheel FL and the rear right wheel RR each of which is a difference calculated by subtracting the wheel speed VW of the front left wheel FL from the vehicle speed VS of the vehicle are large, and both of ABS control for the front left wheel FL and ABS control for the rear right wheel RR are started. At this time, in the brake actuator 30, the retention valves 34a and 34d of the first hydraulic pressure circuit 311 are closed, and the pressure reducing valves 35a and 35d are opened. Accordingly, the WC pressure Pwcfl for the front left wheel and the WC pressure Pwcrr for the rear right wheel are reduced. Since the change rate VIno of the indicator current value for the retention valves 34a and 34d are equal to or higher than the determination change rate VInoTH1 (step S15: YES), it can be predicted that self-excited vibration occurs in the differential pressure control valve 321 connected to the retention valves 34a and 34d through the fluid passages.

The self-excited vibration in the differential pressure control valve 321 occurs by a sharp change of the intermediate hydraulic pressure PM caused by sharp changes in degree of opening of the retention valves 34a and 34d. Accordingly, a time lag occurs until the self-excited vibration begins to occur in the differential pressure control valve 321 after the degrees of opening of the retention valves 34a and 34d begin to change. The time lag is determined depending on the lengths or the like of the fluid passages connecting the differential pressure control valve 321 to the retention valves 34a and 34d. More specifically, the length of the time lag can be known in advance. Accordingly, in the example shown in FIGS. 8A to 8C, immediately after the degrees of opening of the retention valves 34a and 34d begin to decrease, the self-excited vibration suppression control is not executed to the differential pressure control valve 321. Thus, since the self-excited vibration suppression control is prevented from being executed in a situation in which self-excited vibration has not occurred in the differential pressure control valve 321, unnecessary self-excited vibration suppression control is prevented from being executed.

In the example shown in FIG. 8A to 8C, at a timing at which the time lag has elapsed from the second timing t12, both the eleventh intermediate hydraulic pressure prediction value PMEfl that is the sum of the eleventh intermediate hydraulic pressure PMfl and the hydraulic-pressure rising value Pupfl and the twelfth intermediate hydraulic pressure prediction value PMErr that is the sum of the twelfth intermediate hydraulic pressure PMrr and the hydraulic-pressure rising value Puprr are higher than the system upper-limit pressure Pmax (step S23: YES). In this case, since the predetermined suppression control permission conditions are not satisfied, the self-excited vibration suppression control is not executed. Since both the retention valves 34$a$ and 34$d$ are closed thereafter (step S21: YES), the self-excited vibration suppression control is not executed.

Thereafter, after a third timing t13, the degrees of opening of both the retention valves 34$a$ and 34$d$ that are closed gradually increase. As a result, thereafter, at a fourth timing t14, both the eleventh intermediate hydraulic pressure prediction value PMEfl and the twelfth intermediate hydraulic pressure prediction value PMErr are equal to or smaller than system upper-limit pressure Pmax (step S23: NO), and the predetermined suppression control permission conditions are satisfied. Accordingly, the self-excited vibration suppression control is executed to the differential pressure control valve 321. More specifically, the self-excited vibration suppression control is executed to the differential pressure control valve 321 when all of the following conditions are satisfied, namely, the conditions that both the retention valves 34$a$ and 34$d$ connected to the differential pressure control valve 321 in which self-excited vibration is predicted to occur through the fluid passages are not closed, the intermediate hydraulic pressures that are the hydraulic pressures in the fluid passages connecting the differential pressure control valve 321 to the retention valves 34$a$ and 34$d$ is predicted not to exceed the system upper-limit pressure Pmax, and the retention valves 34$a$ and 34$d$ include a retention valve in which the change rate VIno of the indicator current value is equal to or higher than the determination change rate VInoTH1. Accordingly, the intermediate hydraulic pressures PM that are the hydraulic pressures in the fluid passages connecting the differential pressure control valve 321 to the retention valves 34$a$ and 34$d$ can be prevented from becoming excessive due to the execution of the self-excited vibration suppression control.

In the example shown in FIGS. 8A to 8C, the retention valves 34$a$ and 34$d$ do not include a retention valve in which the change rate VIno of the indicator current value is equal to or higher than the other execution determination rate VInoTH2 (step S25: NO). More specifically, it can be predicted that the self-excited vibration occurring in the differential pressure control valve 321 configuring the first hydraulic pressure circuit 311 is transmitted to the differential pressure control valve 322 configuring the second hydraulic pressure circuit 312 through the hydraulic pressure generating device 20, and the self-excited vibration does not occur in the differential pressure control valve 322. Accordingly, the self-excited vibration suppression control is not executed to the differential pressure control valve 322. Thus, the self-excited vibration suppression control can be prevented from being unnecessarily executed to the differential pressure control valve in which no self-excited vibration is predicted to occur.

Next, both an operation and an effect obtained when the self-excited vibration suppression control is also executed to the differential pressure control valve 322 because the self-excited vibration occurring in the differential pressure control valve 321 is transmitted to the differential pressure control valve 322 to also cause self-excited vibration in the differential pressure control valve 322 will be described with reference to a timing chart shown in FIGS. 9A to 9E. In the example shown in FIGS. 9A to 9E, it is assumed that, under a condition in which brake assist is executed, ABS control is started for the front left wheel FL and ABS control is not executed to the other wheels FR, RL, and RR except for the front left wheel FL. In the example shown in FIGS. 9A to 9E, it is assumed that a road surface on which the vehicle travels is rougher than that in the example shown in FIG. 8A to 8C and variation in the wheel speeds VW caused by the roughness on the road surface may occur.

As shown in FIGS. 9A, 9B, 9C, 9D, and 9E, brake assist is started at a first timing t21 while a driver is performing a brake operation, and in the brake actuator 30, both the supply pumps 381 and 382 and the differential pressure control valves 321 and 322 start to be actuated (step S11: YES). Thereafter, at a second timing t22, the ABS control for the front left wheel FL is started. At this time, in the brake actuator 30, the retention valve 34$a$ of the first hydraulic pressure circuit 311 is closed, and the pressure reducing valve 35$a$ is opened. Accordingly, the WC pressure Pwcfl for the front left wheel is reduced. Since the change rate VIno of the indicator current value for the retention valve 34$a$ is equal to or higher than the determination change rate VInoTH1 (step S15: YES), it can be predicted that one of the predetermined suppression control permission conditions is satisfied and self-excited vibration occurs in the differential pressure control valve 321 connected to the retention valve 34$a$ through the fluid passage.

In this case, the retention valve 34$d$ for the rear right wheel is in a full-open state (step S21: NO). Accordingly, even though the eleventh intermediate hydraulic pressure prediction value PMEfl that is a sum of the eleventh intermediate hydraulic pressure PMfl and the hydraulic-pressure rising value Pupfl is larger than the system upper-limit pressure Pmax, the twelfth intermediate hydraulic pressure prediction value PMErr that is a sum of the twelfth intermediate hydraulic pressure PMrr and the hydraulic-pressure rising value Puprr is equal to or smaller than the system upper-limit pressure Pmax (step S22: NO). Thus, in the example shown in FIGS. 9A to 9E, all the predetermined suppression control permission conditions are satisfied at the second timing t22. Shortly after from the second timing t22, the self-excited vibration suppression control is executed to the differential pressure control valve 321 connected to the retention valve 34$a$ through the fluid passage. The time lag described above is set to have a length corresponding to a time lag generated between a change in degree of opening of the retention valve 34$a$ and occurrence of self-excited vibration in the differential pressure control valve 321.

Since the change rate VIno of the indicator current value for the retention valve 34$a$ for the front left wheel from the second timing t22 is high, an indicator differential pressure current value Ism1 of the differential pressure control valve 321 in execution of the self-excited vibration suppression control set to be a larger value (see FIG. 6). Accordingly, when the amplitude of the self-excited vibration in the differential pressure control valve 321 is larger, force pressing the valve element 54 against the valve seat 521 increases. Thus, even though the amplitude of the self-excited vibration occurring in the differential pressure control valve 321 is large, the self-excited vibration can be suppressed by the execution of the self-excited vibration suppression control.

In the example shown in FIGS. 9A to 9E, the change rate VIno of the indicator current value for the front left wheel from the second timing t22 is higher than the other execution determination rate VInoTH2 (step S25: YES). Accordingly, it can be predicted that the self-excited vibration occurring in the differential pressure control valve 321 configuring the first hydraulic pressure circuit 311 is transmitted to the differential pressure control valve 322 configuring the second hydraulic pressure circuit 312 through the hydraulic pressure generating device 20, and the self-excited vibration also occurs in the differential pressure control valve 322. Accordingly, the self-excited vibration suppression control is also executed to the differential pressure control valve 322. Thus, the self-excited vibration occurring in the differential pressure control valve 322 can also be appropriately suppressed, and, therefore, abnormal noise caused by the self-excited vibration occurring in the differential pressure control valve 322 can be prevented from being generated.

When the self-excited vibration suppression control is executed to the differential pressure control valve 322, an indicator differential pressure current value Ism2 for the differential pressure control valve 322 is also set to be a value depending on the change rate VIno of the indicator current value for the retention valve 34a for the front left wheel from the second timing t22 (see FIG. 7). Accordingly, when the amplitude of the self-excited vibration in the differential pressure control valve 322 is larger, force pressing the valve element 54 against the valve seat 521 increases. Thus, even though the amplitude of the self-excited vibration occurring in the differential pressure control valve 322 is large, the self-excited vibration is appropriately suppressed by the execution of the self-excited vibration suppression control.

Note that the amplitude of the self-excited vibration in the differential pressure control valve 322 to which the self-excited vibration is transmitted is smaller than the amplitude of the self-excited vibration in the differential pressure control valve 321 from which the self-excited vibration is transmitted. Accordingly, when the indicator differential pressure current value Ism2 obtained in the self-excited vibration suppression control for the differential pressure control valve 322 is equal to the indicator differential pressure current value Ism1 obtained in the self-excited vibration suppression control for the differential pressure control valve 321, the self-excited vibration can be reliably stopped. In consideration of a difference between the amplitude of the self-excited vibration in the differential pressure control valve 321 and the amplitude of the self-excited vibration in the differential pressure control valve 322, the indicator differential pressure current value Ism2 obtained in the self-excited vibration suppression control may be set smaller than the indicator differential pressure current value Ism1 obtained in the self-excited vibration suppression control as shown in FIGS. 9A to 9E. The settings can be performed by designing the map shown in FIG. 7.

In the period in which the ABS control is executed, thereafter, the degree of opening of the retention valve 34a changes, and self-excited vibration may occur in the differential pressure control valve 321. For example, at a third timing t23, the indicator current value Ino for the retention valve 34a sharply changes. In addition, the change rate VIno of the indicator current value at this time is equal to or higher than determination change rate VInoTH1 (step S15: YES). Accordingly, the self-excited vibration suppression control is executed to the differential pressure control valve 321 connected to the retention valve 34a through the fluid passage. Also in this case, the self-excited vibration suppression control is started shortly after the third timing t23.

However, the change rate VIno of the indicator current value obtained at this time is lower than the change rate VIno of the indicator current value for the retention valve 34a for the front left wheel from the second timing t22. Accordingly, in the self-excited vibration suppression control started from the third timing t23, the indicator differential pressure current value Ism1 for the differential pressure control valve 321 is set to be smaller than that in the execution of the self-excited vibration suppression control started from the second timing t22.

When the amplitude of the self-excited vibration occurring in the differential pressure control valve 321 is small, even though force pressing the valve element 54 against the valve seat 521 is small, the self-excited vibration can be appropriately suppressed. Accordingly, the indicator differential pressure current value Ism is decreased. Thus, with the execution of the self-excited vibration suppression control, a large current is prevented from excessively flowing in the solenoid 57 of the differential pressure control valve 321. Thus, while the self-excited vibration occurring in the differential pressure control valve 321 is appropriately suppressed, the life of the differential pressure control valve 321 can be prevented from being shortened by the execution of the self-excited vibration suppression control.

The change rate VIno of the indicator current value from the third timing t23 is lower than the other execution determination rate VInoTH2 (step S25: NO). In this case, even when the self-excited vibration occurs in the differential pressure control valve 321, it can be predicted that self-excited vibration does not occur in the differential pressure control valve 322 of the second hydraulic pressure circuit 312. Accordingly, at the third timing t23, the self-excited vibration suppression control is not executed to the differential pressure control valve 322. Thus, the self-excited vibration suppression control for the differential pressure control valve 322 can be prevented from being unnecessarily executed.

Since an operation and an effect obtained when self-excited vibration occurs in the differential pressure control valve 322 of the second hydraulic pressure circuit 312 are the same as those obtained when self-excited vibration occurs in the differential pressure control valve 321 of the first hydraulic pressure circuit 311, a description thereof will be omitted.

The above embodiments may be changed into another embodiment described below.

In the above embodiments, when only one of both the retention valves (the retention valves 34a and 34d in the first hydraulic pressure circuit 311) configuring one hydraulic pressure circuit is closed, execution of the self-excited vibration suppression control may cause the valve element 54 to press against the valve seat 521 in the differential pressure control valves 321 and 322. In this case, the differential pressure control valves 321 and 322 are temporarily closed, brake fluid discharged from the pumps 381 and 382 flows into a wheel cylinder (for example, the wheel cylinder 11a) through an unclosed retention valve (for example, the retention valve 34a) of both the retention valves, and the WC pressure Pwc may be increased. As a result, the accuracy of vehicle stability control such as anti-lock brake system control may be disadvantageously deteriorated.

Figure 10:
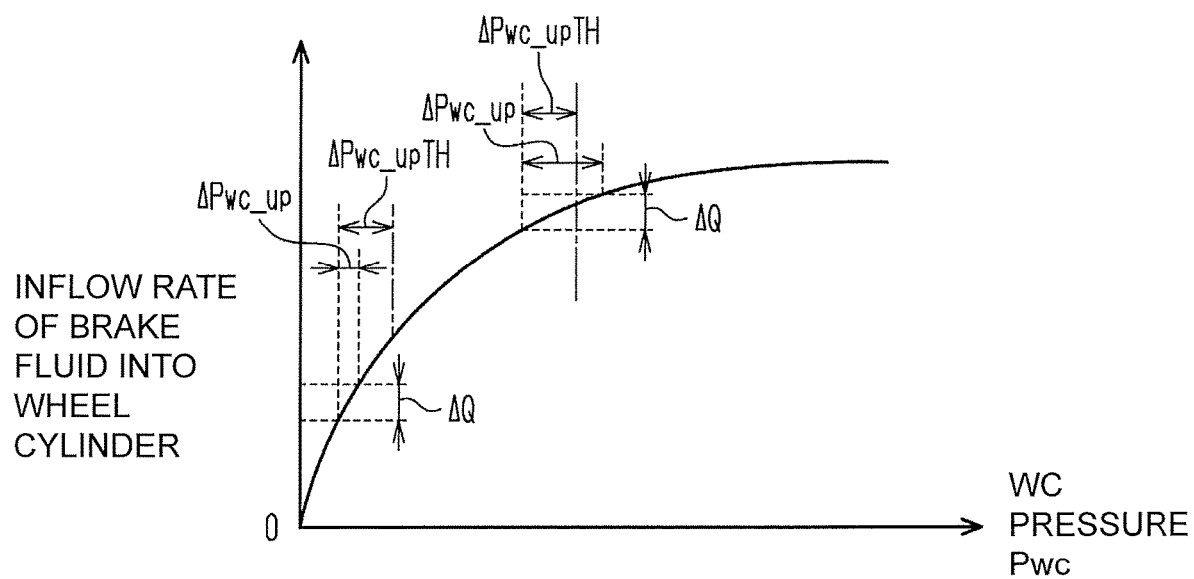
FIG. 10 is a graph showing a relationship between an inflow rate of a brake fluid into a wheel cylinder and a WC pressure, i.e., a hydraulic pressure in the wheel cylinder.

FIG. 10 shows a relationship between a flow rate of brake fluid into the wheel cylinders 11a to 11d and a WC pressure Pwc. When increase rates are defined as rates of an increment of the WC pressure Pwc to increments of the flow rates of the brake fluid into the wheel cylinders 11a to 11d, the increase rates increase when the WC pressures Pwc in the wheel cylinders 11a to 11d become higher as shown in FIG. 10. Accordingly, by execution of the self-excited vibration suppression control under the situation in which only one retention valve (for example, the retention valve 34d) of both the retention valves is closed, when an amount of brake fluid flowing into a wheel cylinder (the wheel cylinder 11a) corresponding to the other retention valve (for example, the retention valve 34a) that is not closed is defined as a specified flow rate ΔQ, a WC pressure increment ΔPwc_up that is an increment of the WC pressure when the amount of brake fluid in the wheel cylinder increases by the specified flow rate ΔQ becomes larger when the WC pressure Pwc obtained at the start of the self-excited vibration suppression control is higher. When the increment of the WC pressure that is a criterion for determining whether the accuracy of vehicle behavior stability control tends to be deteriorated is defined as a limited determination amount ΔPwc_upTH, the WC pressure increment ΔPwc_up does not easily become smaller than the limited determination amount ΔPwc_upTH when the WC pressure Pwc at the start of the self-excited vibration suppression control is relatively low. On the other hand, when the WC pressure Pwc at the start of the self-excited vibration suppression control is relatively high, the WC pressure increment ΔPwc_up easily becomes larger than the limited determination amount ΔPwc_upTH. Thus, when a predicted increment ΔPwc_upE that is a predicted value of the increment of the WC pressure Pwc obtained by the execution of the self-excited vibration suppression control is larger than the limited determination amount ΔPwc_upTH, the self-excited vibration suppression control is preferably prohibited from being executed, and the indicator differential pressure current value Ism in the execution of the self-excited vibration suppression control is preferably reduced and corrected.

Figure 11:
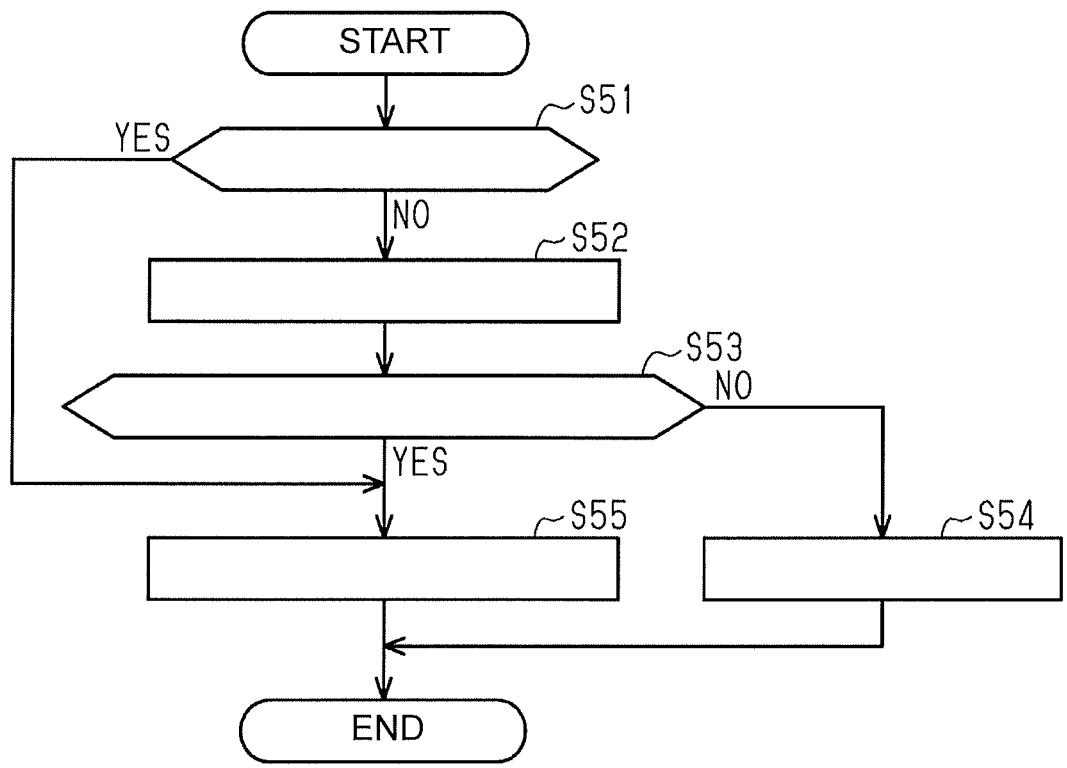
FIG. 11 is a flow chart for explaining a process routine executed at a timing of execution of the self-excited vibration suppression control in the brake device for vehicle that is another embodiment of a hydraulic control device for vehicles.

FIG. 11 shows a process routine executed by the control device 100 to prevent the self-excited vibration suppression control from being executed when the accuracy of vehicle stability control may be deteriorated by the execution of the self-excited vibration suppression control. This process routine is executed at an execution timing of the self-excited vibration suppression control.

As shown in FIG. 11, the control device 100 determines whether both the retention valves configuring the hydraulic pressure circuit including a differential pressure control valve to which the self-excited vibration suppression control is executed are closed (step S51). When the differential pressure control valve to which the self-excited vibration suppression control is executed is the differential pressure control valve 321, it is determined whether the retention valves 34a and 34d are closed. When the differential pressure control valve to which the self-excited vibration suppression control is executed is the differential pressure control valve 322, it is determined whether the retention valves 34b and 34c are closed. Whether the retention valve serving as an examination target is closed is determined based on the indicator current value Ino for the retention valve.

When both the retention valves (for example, the retention valves 34a and 34d) are closed (step S51: YES), the control device 100 shifts the process to the next step S55. On the other hand, when one of both the retention valves is not closed (step S51: NO), the control device 100 calculates the predicted increment ΔPwc_upE of the WC pressure in the wheel cylinder corresponding to the retention valve that is not closed (step S52). For example, when the retention valve that is not closed is the retention valve 34a, since the wheel cylinder corresponding to the retention valve 34a is the wheel cylinder 11a, the predicted increment ΔPwc_upE of the WC pressure in the wheel cylinder 11a is calculated. At this time, on the assumption that the retention valve 34d is closed, the predicted increment ΔPwc_upE of the WC pressure in the wheel cylinder 11a is calculated. It can be predicted that, when the indicator differential pressure current value Ism for the differential pressure control valve is larger, force pressing the valve element 54 against the valve seat 521 becomes stronger, and an inflow rate of brake fluid into the wheel cylinder 11a increases. When the WC pressure Pwc of the wheel cylinder 11a corresponding to the retention valve 34a that is not closed is higher, an increment of the WC pressure becomes larger (see FIG. 10). Accordingly, the control device 100 can calculate the predicted increment ΔPwc_upE of the WC pressure based on the indicator differential pressure current value Ism for the differential pressure control valve and the WC pressure Pwc in the wheel cylinder corresponding to the retention valve that is not closed.

The control device 100 determines whether the predicted increment ΔPwc_upE of the calculated WC pressure is equal to or larger than the limited determination amount ΔPwc_upTH (step S53). When the predicted increment ΔPwc_upE of the WC pressure is lower than the limited determination amount ΔPwc_upTH (step S53: NO), it can be determined that the accuracy of the vehicle stability control is not deteriorated, or a decrement thereof falls within an allowable range. Accordingly, the control device 100 executes the self-excited vibration suppression control to a target differential pressure control valve (step S54), and thereafter, ends the process routine. On the other hand, when the predicted increment ΔPwc_upE of the WC pressure is equal to or larger than the limited determination amount ΔPwc_upTH (step S53: YES), it can be determined that the decrement of the accuracy of the vehicle stability control may exceed the allowable range. Accordingly, the control device 100 shifts the process to the next step S55.

In step S55, the control device 100 prohibits the self-excited vibration suppression control to the target differential pressure control valve from being executed (step S55), and thereafter, ends the process routine.

With this configuration, when it can be predicted that the WC pressure Pwc in the wheel cylinder excessively rises by executing the self-excited vibration suppression control on the differential pressure control valve, the self-excited vibration suppression control is prevented from being executed to prevent the accuracy of the vehicle stability control from being deteriorated.

Figure 12:
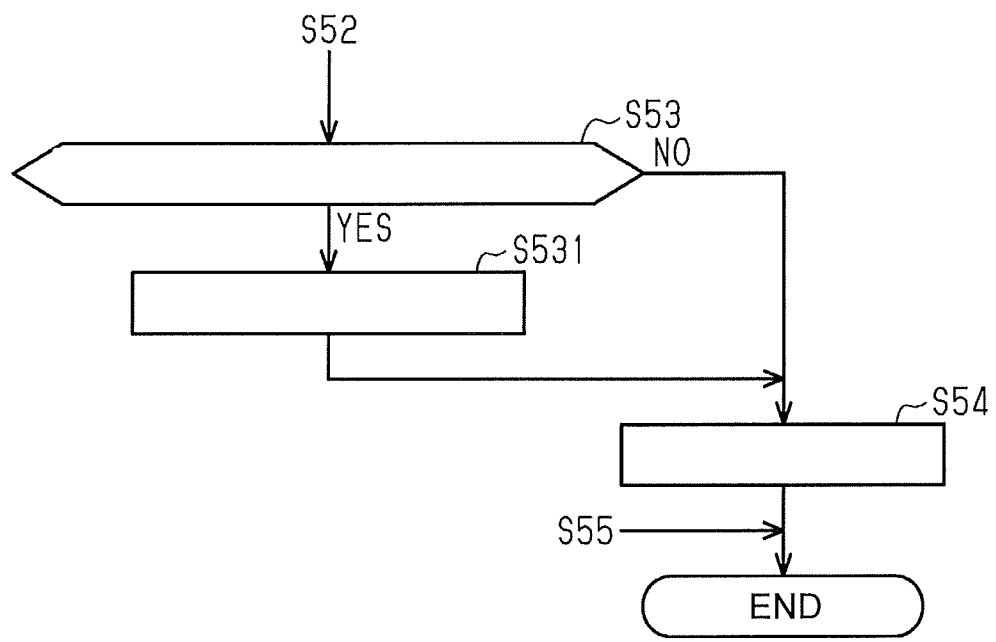
FIG. 12 is a flow chart for explaining a part of a process routine executed at a timing of execution of the self-excited vibration suppression control in the brake device for vehicle that is still another embodiment of a hydraulic control device for vehicles.

FIG. 12 shows a process routine executed by the control device 100 to decrease the indicator differential pressure current value Ism for the differential pressure control valve when the accuracy of the vehicle stability control may be deteriorated by the execution of the self-excited vibration suppression control. The process routine is executed at an execution timing of the self-excited vibration suppression control. FIG. 12 mainly shows a different part between the process routine in FIG. 11 and the process routine in FIG. 12.

As shown in FIG. 12, when both the retention valves configuring the hydraulic pressure circuit in which the self-excited vibration suppression control is executed to a differential pressure control valve are closed (step S51: YES), the control device 100 prohibits the self-excited vibration suppression control to the target differential pressure control valve from being executed (step S55), and thereafter, ends the process routine. On the other hand, when one of both the retention valves is not closed (step S51: NO), the control device 100 calculates the predicted increment ΔPwc_upE of the WC pressure in the wheel cylinder corresponding to the retention valve that is not closed (step S52). When the calculated predicted increment ΔPwc_upE of the calculated WC pressure is smaller than the limited determination amount ΔPwc_upTH (step S53: NO), the control device 100 executes the self-excited vibration suppression control to the target differential pressure control valve (step S54), and thereafter, ends the process routine. In this case, since the self-excited vibration suppression control can be executed without decreasing the indicator differential pressure current value Ism calculated as described above, the self-excited vibration of the differential pressure control valve can be appropriately attenuated.

On the other hand, when the predicted increment ΔPwc_upE of the WC pressure is equal to or larger than the limited determination amount ΔPwc_upTH (step S53: YES), the control device 100 performs a recalculation process to decrease the indicator differential pressure current value Ism calculated as described above (step S531). For example, the indicator differential pressure current value Ism is recalculated to make the predicted increment ΔPwc_upE of the WC pressure equal to or smaller than the limited determination amount ΔPwc_upTH. In this case, when the WC pressure Pwc in the wheel cylinder is higher, the indicator differential pressure current value Ism decreases. The control device 100 executes the self-excited vibration suppression control to a target differential pressure control valve (step S54), and thereafter, ends the process routine. In this case, in the execution of the self-excited vibration suppression control, the recalculated indicator differential pressure current value Ism flows into the solenoid 57 of the differential pressure control valve. Accordingly, in comparison with the case in which the indicator differential pressure current value Ism is not recalculated, force pressing the valve element 54 against the valve seat 521 may be weakened, or the valve element 54 may not sit on the valve seat 521. However, by executing the self-excited vibration suppression control, the WC pressure Pwc in the wheel cylinder into which brake fluid flows through the unclosed retention valve can be prevented from rising. Accordingly, although an effect of suppressing the self-excited vibration in the differential pressure control valve is decreased, the accuracy of the vehicle stability control executed at this time can be prevented from being deteriorated.

When the recalculated indicator differential pressure current value Ism is smaller than the closed-valve minimum current value IsmA, the self-excited vibration suppression control can be prohibited from being executed. A larger value between the recalculated indicator differential pressure current value Ism and the closed-valve minimum current value IsmA may be defined as the indicator differential pressure current value Ism, and the self-excited vibration suppression control may be executed based on this indicator differential pressure current value Ism.

In the self-excited vibration suppression control, when the change rate VIno of the indicator current value for the retention valves 34a to 34d increases, the indicator differential pressure current values Ism for the differential pressure control valves 321 and 322 may be stepwise increased. Even in this case, when the change rates VIno of the indicator current values for the retention valves 34a to 34d are larger, force pressing the valve element 54 against the valve seat 521 in each of the differential pressure control valves 321 and 322 becomes larger.

In the above embodiments, even when it is predicted that the self-excited vibration occurs in the differential pressure control valve of one hydraulic pressure circuit of the hydraulic pressure circuits 311 and 312, when it is predicted that the amplitude of the self-excited vibration in the differential pressure control valve is small, the self-excited vibration suppression control is prevented from being executed to the differential pressure control valve of the other hydraulic pressure circuit. However, even when it is predicted that the self-excited vibration occurs in the differential pressure control valve of one hydraulic pressure circuit of the hydraulic pressure circuits 311 and 312, regardless of a prediction result of the magnitude of the amplitude of self-excited vibration in the differential pressure control valve, the self-excited vibration suppression control may also be executed to the differential pressure control valve of the other hydraulic pressure circuit.

When self-excited vibration also occurs in the differential pressure control valve of the other hydraulic pressure circuit because the self-excited vibration occurs in the differential pressure control valve of one hydraulic pressure circuit of the hydraulic pressure circuits 311 and 312, an occurrence timing of the self-excited vibration in the differential pressure control valve of the other hydraulic pressure circuit is later than an occurrence timing of the self-excited vibration in the differential pressure control valve of one hydraulic pressure circuit. Accordingly, when self-excited vibration also occurs in the differential pressure control valve of the other hydraulic pressure circuit because the self-excited vibration occurs in the differential pressure control valve of one hydraulic pressure circuit, an execution timing of the self-excited vibration suppression control for the differential pressure control valve of the other hydraulic pressure circuit may be made later than an execution timing of the self-excited vibration suppression control for the differential pressure control valve of one hydraulic pressure circuit.

When self-excited vibration also occurs in the differential pressure control valve of the other hydraulic pressure circuit because the self-excited vibration occurs in the differential pressure control valve of one hydraulic pressure circuit of the hydraulic pressure circuits 311 and 312, in execution of the self-excited vibration suppression control for the differential pressure control valve of the other hydraulic pressure circuit, the indicator differential pressure current value Ism for the differential pressure control valve may be set to a constant value regardless of the magnitude of the change rate VIno of the indicator current value for the retention valve of one hydraulic pressure circuit.

When it is predicted that, due to a change of the indicator current value Ino for a retention valve, self-excited vibration occurs in the differential pressure control valve connected to the retention valve through the fluid passage, the self-excited vibration suppression control is executed to the differential pressure control valve. At this time, the indicator differential pressure current value Ism may be set to a constant value regardless of the magnitude of the change rate VIno of the indicator current value for the retention valve. In this case, even though the amplitude of the self-excited vibration is large, in order to appropriately suppress the self-excited vibration, the indicator differential pressure current value Ism is preferably set sufficiently larger than the closed-valve minimum current value IsmA.

Although in the above embodiments, the retention valves 34a to 34d corresponding to linear electromagnetic valves in which degrees of opening correlate with indicator currents are employed, a two-position valve that is closed (turned on) when a current flowing into a solenoid is equal to or larger than a predetermined value and is opened (turned off) when the current is smaller than the predetermined value may be employed as each of the retention valves. In this case, when the solenoid is energized to close the retention valve, a valve closing rate of the retention valve increases when a change rate of the current flowing into the solenoid is higher. The change rate VIno of the indicator current value obtained in this case may be a quotient obtained such that an indicator current value or an actual current value obtained immediately before the opened valve is changed into the closed valve is subtracted from the indicator current value in a closed valve state and the difference is divided by a predetermined time (for example, a calculation interval). Duty drive in which a current input to the retention valve is repeatedly turned on and off at small cycles may be employed. In this case, an average indicator current value for a predetermined time (a duty cycle or a predetermined time longer than a duty cycle) may be defined as the indicator current value, and the change rate VIno of the indicator current value may be calculated in the same manner as that in the above embodiments.

When, for example, select-low ABS control is executed, the WC pressures Pwc of both the rear wheels RL and RR (or both the front wheels FL and FR) are to be adjusted. In this case, it is predicted that, in the first hydraulic pressure circuit 311, the retention valve configuring the first hydraulic pressure circuit 311 is actuated to cause self-excited vibration in the differential pressure control valve 321. It is also predicted that, in the second hydraulic pressure circuit 312, the retention valve configuring the second hydraulic pressure circuit 312 is actuated to cause self-excited vibration in the differential pressure control valve 322. Accordingly, when the self-excited vibration suppression control is executed in such a state, the indicator differential pressure current value Ism for the differential pressure control valve 321 may be set by using the map shown in FIG. 6, and the indicator differential pressure current value Ism for the differential pressure control valve 322 may be set by using the map shown in FIG. 6.

In this case, an execution timing of the self-excited vibration suppression control for the differential pressure control valve 321 is preferably set depending on actuation of the retention valves 34a and 34d of the first hydraulic pressure circuit 311. Similarly, an execution timing of the self-excited vibration suppression control for the differential pressure control valve 322 is preferably set depending on actuation of the retention valves 34b and 34c of the second hydraulic pressure circuit 312.

In the above embodiments, when both the eleventh intermediate hydraulic pressure prediction value PMEfl and the twelfth intermediate hydraulic pressure prediction value PMErr are larger than the system upper-limit pressure Pmax, the self-excited vibration suppression control for the differential pressure control valve 321 is prohibited from being executed to protect the fluid passages connecting the differential pressure control valve 321 to the retention valves 34a and 34d in the first hydraulic pressure circuit 311. However, even in this case, when force pressing the valve element 54 against the valve seat 521 in the differential pressure control valve 321 is weak, the brake fluid in the fluid passages connecting the differential pressure control valve 321 to the retention valves 34a and 34d can flow to the master cylinder 22 side through the differential pressure control valve 321. Accordingly, when both the eleventh intermediate hydraulic pressure PMfl and the twelfth intermediate hydraulic pressure PMrr are higher than the system upper-limit pressure Pmax, the self-excited vibration suppression control may be executed as long as the indicator differential pressure current value Ism for the differential pressure control valve 321 is not made relatively large. For example, the indicator differential pressure current value Ism may be equal to the closed-valve minimum current value IsmA to execute the self-excited vibration suppression control based on the indicator differential pressure current value Ism.

Similarly, when both the twenty-first intermediate hydraulic pressure prediction value PMEfr and the twenty-second intermediate hydraulic pressure prediction value PMErl are higher than the system upper-limit pressure Pmax, the self-excited vibration suppression control may be executed as long as the indicator differential pressure current value Ism for the differential pressure control valve 322 is not made relatively large. For example, the indicator differential pressure current value Ism may be equal to the closed-valve minimum current value IsmA to execute the self-excited vibration suppression control based on the indicator differential pressure current value Ism.

In the above embodiments, when both the retention valves 34a and 34d are closed, the self-excited vibration suppression control is prohibited from being executed to the differential pressure control valve 321 to protect the fluid passages connecting the differential pressure control valve 321 to the retention valves 34a and 34d in the first hydraulic pressure circuit 311. However, even in this case, when force pressing the valve element 54 against the valve seat 521 in the differential pressure control valve 321 is weak, the brake fluid in the fluid passages connecting the differential pressure control valve 321 to the retention valves 34a and 34d can flow to the master cylinder 22 side through the differential pressure control valve 321. Accordingly, when both the retention valves 34a and 34d are closed, the self-excited vibration suppression control may be executed as long as the indicator differential pressure current value Ism for the differential pressure control valve 321 is not made relatively large. For example, the indicator differential pressure current value Ism may be equal to the closed-valve minimum current value IsmA to execute the self-excited vibration suppression control based on the indicator differential pressure current value Ism.

Similarly, when both the twenty-first intermediate hydraulic pressure PMfr and the twenty-second intermediate hydraulic pressure PMrl are closed, the self-excited vibration suppression control may be executed as long as the indicator differential pressure current value Ism for the differential pressure control valve 322 is not made relatively large. For example, the indicator differential pressure current value Ism may be equal to the closed-valve minimum current value IsmA to execute the self-excited vibration suppression control based on the indicator differential pressure current value Ism.

When the retention valves 34a to 34d are closed, the calculated intermediate hydraulic pressures PMfl, PMrr, PMfr, and PMrl become higher than the system upper-limit pressure Pmax. Accordingly, a determination process in step S21 in the process routine shown in FIG. 4 may be omitted, and a determination process in step S31 in the process routine shown in FIG. 5 may be omitted. Even in the case, the same effect as that in the above embodiments can be obtained.

In the brake actuator 30, when both the differential pressure control valves 321 and 322 and the supply pumps 381 and 382 are actuated, the WC pressures Pwc in the wheel cylinders 11a to 11d may be adjusted to execute automatic brake applying brake force to the vehicle. Even while such automatic brake is being executed, self-excited vibration may occur in the differential pressure control valves 321 and 322 due to the actuation of the retention valves 34a to 34d. Accordingly, even though a driver does not perform a brake operation, when the predetermined suppression control permission conditions are satisfied under the situation in which both the differential pressure control valves 321 and 322 and the supply pumps 381 and 382 are actuated, since self-excited vibration may occur in the differential pressure control valves 321 and 322, the self-excited vibration suppression control may be executed to the differential pressure control valves 321 and 322.

However, when the driver does not perform a brake operation, even though intermediate hydraulic pressures that are the hydraulic pressures in the fluid passages connecting the differential pressure control valves 321 and 322 to the retention valves 34a to 34d increase sharply, brake fluid flowing from the outflow path 5111 into the valve chest 53 easily flows to the master cylinder 22 side through the inflow path 522. Accordingly, in comparison with the case in which the brake operation is performed, even though the self-excited vibration occurs in the differential pressure control valves 321 and 322, it can be predicted that the amplitude of the self-excited vibration is small. Thus, when the self-excited vibration suppression control is executed to the differential pressure control valves 321 and 322 under the situation in which the brake operation is not performed, the indicator differential pressure current value Ism for the differential pressure control valves 321 and 322 may be set smaller than that obtained when the self-excited vibration suppression control is executed under the situation in which the brake operation is performed.

In the above embodiments, normally-opened type linear electromagnetic valves whose degrees of opening decrease by increasing the indicator differential pressure current value Ism are employed as the differential pressure control valves 321 and 322, but the present invention is not limited to this configuration, and normally-closed type linear electromagnetic valves whose degrees of opening decrease by decreasing the indicator differential pressure current value Ism may also be employed. In this case, in the execution of the self-excited vibration suppression control, the indicator differential pressure current value Ism is temporarily made smaller than the indicator differential pressure current value obtained immediately before the start of the self-excited vibration suppression control to bring the valve element 54 into contact with the valve seat 521.

The brake device 10 may be another brake device as long as the device includes a differential pressure control valve and a pressure adjusting unit connected to the differential pressure control valve through a fluid passage, and is configured to cause self-excited vibration in the differential pressure control valve due to actuation of the pressure adjusting unit.

A hydraulic control device for vehicles may be embodied as another hydraulic control device whose control target is not wheel cylinders 11a to 11d.

The invention claimed is:
1. A hydraulic control device for vehicles, comprising:
a differential pressure control valve connected to a control target disposed in a vehicle, through a fluid passage in which a fluid flows;
a pressure adjusting unit connected to the differential pressure control valve through the fluid passage in which the fluid flows; and
a control unit configured to actuate the differential pressure control valve and the pressure adjusting unit to control an inflow of the fluid into the control target,
the differential pressure control valve including a valve seat, a valve element configured to move in a direction approaching the valve seat and in a direction away from the valve element, and a solenoid in which a current flows,
the differential pressure control valve being configured to change a spacing between the valve seat and the valve element depending on the current flowing in the solenoid, wherein
under a situation in which both the differential pressure control valve and the pressure adjusting unit are actuated, when predetermined suppression control permission conditions are satisfied, the control unit executes, on the differential pressure control valve, a self-excited vibration suppression control that brings the valve element into contact with the valve seat and then separates the valve element from the valve seat,
the control target is a wheel cylinder disposed on a wheel, a brake force applied to the wheel increases as a hydraulic pressure in the wheel cylinder is increased,
the hydraulic control device for vehicles further comprises a hydraulic pressure generating device that is disposed opposite the wheel cylinder across the differential pressure control valve in the fluid passage in which the fluid flows and is configured to generate a hydraulic pressure depending on an operation of a brake operation member,
the pressure adjusting unit includes a retention valve that is a normally-opened, second electromagnetic valve disposed in a fluid passage connecting the differential pressure control valve to the wheel cylinder, and a pump configured to pump a fluid to a fluid passage connecting the retention valve to the differential pressure control valve,
the differential pressure control valve is an electromagnetic valve configured to adjust a differential pressure between a pressure on the hydraulic pressure generating device side of the differential pressure control valve and a pressure on the retention valve side of the electromagnetic valve in a situation in which the fluid is pumped from the pump,
the control unit is configured to actuate the differential pressure control valve and the pressure adjusting unit to adjust the hydraulic pressure in the wheel cylinder, and
when the control unit actuates both the differential pressure control valve and the pump to adjust the hydraulic pressure in the wheel cylinder, then the control unit, if the retention valve is not closed, 1) assumes that that the predetermined suppression control permission conditions are satisfied and 2) executes the self-excited vibration suppression control on the differential pressure control valve.

2. The hydraulic control device for vehicles according to claim 1, wherein
the retention valve is configured such that as the current flowing in the retention valve increases, a degree of opening of the retention valve decreases, or a valve closing rate increases, and
when the control unit actuates both the differential pressure control valve and the pump to adjust the hydraulic pressure in the wheel cylinder, then the control unit, if a change rate of the current flowing in the retention valve is equal to or higher than a determination change rate, 1) assumes that that the predetermined suppression control permission conditions are satisfied and 2) executes the self-excited vibration suppression control on the differential pressure control valve.

3. The hydraulic control device for vehicles according to claim 2, wherein in the self-excited vibration suppression control, the control unit increases a force pressing the valve element against the valve seat when the valve element sits on the valve seat with an increase of the change rate of the current flowing in the retention valve.

4. The hydraulic control device for vehicles according to claim 1, wherein in a case where a hydraulic pressure set to protect the fluid passage connecting the differential pressure control valve to the retention valve is defined as a system upper-limit pressure, when the control unit actuates both the differential pressure control valve and the pump to adjust the hydraulic pressure in the wheel cylinder, then the control unit, if the hydraulic pressure in the fluid passage connecting the differential pressure control valve to the retention valve is predicted to be equal to or lower than the system upper-limit pressure when the differential pressure control valve is closed, 1) assumes that that the predetermined suppression control permission conditions are satisfied and 2) executes the self-excited vibration suppression control on the differential pressure control valve.

5. The hydraulic control device for vehicles according to claim 4, wherein
the retention valve is configured such that as the current flowing in the retention valve increases, a degree of opening of the retention valve decreases, or a valve closing rate increases, and
when the control unit actuates both the differential pressure control valve and the pump to adjust the hydraulic pressure in the wheel cylinder, then the control unit, if a change rate of the current flowing in the retention valve is equal to or higher than a determination change rate, 1) assumes that that the predetermined suppression control permission conditions are satisfied and 2) executes the self-excited vibration suppression control on the differential pressure control valve.

6. The hydraulic control device for vehicles according to claim 5, wherein in the self-excited vibration suppression control, the control unit increases a force pressing the valve element against the valve seat when the valve element sits on the valve seat with an increase of the change rate of the current flowing in the retention valve.

7. A hydraulic control device for vehicles, comprising:
a differential pressure control valve connected to a control target disposed in a vehicle, through a fluid passage in which a fluid flows;
a pressure adjusting unit connected to the differential pressure control valve through the fluid passage in which the fluid flows; and
a control unit configured to actuate the differential pressure control valve and the pressure adjusting unit to control an inflow of the fluid into the control target,
the differential pressure control valve including a valve seat, a valve element configured to move in a direction approaching the valve seat and in a direction away from the valve element, and a solenoid in which a current flows,
the differential pressure control valve being configured to change a spacing between the valve seat and the valve element depending on the current flowing in the solenoid, wherein
under a situation in which both the differential pressure control valve and the pressure adjusting unit are actuated, when predetermined suppression control permission conditions are satisfied, the control unit executes, on the differential pressure control valve, a self-excited vibration suppression control that brings the valve element into contact with the valve seat and then separates the valve element from the valve seat,
the control target is a wheel cylinder disposed on a wheel, a brake force applied to the wheel increases as a hydraulic pressure in the wheel cylinder is increased,
the hydraulic control device for vehicles further comprises a hydraulic pressure generating device that is disposed opposite the wheel cylinder across the differential pressure control valve in the fluid passage in which the fluid flows and is configured to generate a hydraulic pressure depending on an operation of a brake operation member,
the pressure adjusting unit includes a retention valve that is a normally-opened, second electromagnetic valve disposed in a fluid passage connecting the differential pressure control valve to the wheel cylinder, and a pump configured to pump a fluid to a fluid passage connecting the retention valve to the differential pressure control valve,
the differential pressure control valve is an electromagnetic valve configured to adjust a differential pressure between a pressure on the hydraulic pressure generating device side of the differential pressure control valve and a pressure on the retention valve side of the electromagnetic valve in a situation in which the fluid is pumped from the pump,
the control unit is configured to actuate the differential pressure control valve and the pressure adjusting unit to adjust the hydraulic pressure in the wheel cylinder, and
in a case where a hydraulic pressure set to protect the fluid passage connecting the differential pressure control valve to the retention valve is defined as a system upper-limit pressure, when the control unit actuates both the differential pressure control valve and the pump to adjust the hydraulic pressure in the wheel cylinder, then the control unit, if the hydraulic pressure in the fluid passage connecting the differential pressure control valve to the retention valve is predicted to be equal to or lower than the system upper-limit pressure when the differential pressure control valve is closed, 1) assumes that that the predetermined suppression control permission conditions are satisfied and 2) executes the self-excited vibration suppression control on the differential pressure control valve.

8. The hydraulic control device for vehicles according to claim 7, wherein
the retention valve is configured such that as the current flowing in the retention valve increases, a degree of opening of the retention valve decreases, or a valve closing rate increases, and
when the control unit actuates both the differential pressure control valve and the pump to adjust the hydraulic pressure in the wheel cylinder, then the control unit, if a change rate of the current flowing in the retention valve is equal to or higher than a determination change rate, 1) assumes that that the predetermined suppression control permission conditions are satisfied and 2) executes the self-excited vibration suppression control on the differential pressure control valve.

9. The hydraulic control device for vehicles according to claim 8, wherein in the self-excited vibration suppression control, the control unit increases a force pressing the valve element against the valve seat when the valve element sits on the valve seat with an increase of the change rate of the current flowing in the retention valve.

10. A hydraulic control device for vehicles, comprising:
a differential pressure control valve connected to a control target disposed in a vehicle, through a fluid passage in which a fluid flows;
a pressure adjusting unit connected to the differential pressure control valve through the fluid passage in which the fluid flows; and
a control unit configured to actuate the differential pressure control valve and the pressure adjusting unit to control an inflow of the fluid into the control target,
the differential pressure control valve including a valve seat, a valve element configured to move in a direction approaching the valve seat and in a direction away from the valve element, and a solenoid in which a current flows,
the differential pressure control valve being configured to change a spacing between the valve seat and the valve element depending on the current flowing in the solenoid, wherein
under a situation in which both the differential pressure control valve and the pressure adjusting unit are actuated, when predetermined suppression control permission conditions are satisfied, the control unit executes, on the differential pressure control valve, a self-excited vibration suppression control that brings the valve element into contact with the valve seat and then separates the valve element from the valve seat,
the control target is a wheel cylinder disposed on a wheel, a brake force applied to the wheel increases as a hydraulic pressure in the wheel cylinder is increased,
the hydraulic control device for vehicles further comprises a hydraulic pressure generating device that is disposed opposite the wheel cylinder across the differential pressure control valve in the fluid passage in which the fluid flows and is configured to generate a hydraulic pressure depending on an operation of a brake operation member,
the pressure adjusting unit includes a retention valve that is a normally-opened, second electromagnetic valve disposed in a fluid passage connecting the differential pressure control valve to the wheel cylinder, and a pump configured to pump a fluid to a fluid passage connecting the retention valve to the differential pressure control valve,
the differential pressure control valve is an electromagnetic valve configured to adjust a differential pressure between a pressure on the hydraulic pressure generating device side of the differential pressure control valve and a pressure on the retention valve side of the electromagnetic valve in a situation in which the fluid is pumped from the pump,
the control unit is configured to actuate the differential pressure control valve and the pressure adjusting unit to adjust the hydraulic pressure in the wheel cylinder,
the retention valve is configured such that as the current flowing in the retention valve increases, a degree of opening of the retention valve decreases, or a valve closing rate increases, and
when the control unit actuates both the differential pressure control valve and the pump to adjust the hydraulic pressure in the wheel cylinder, then the control unit, if a change rate of the current flowing in the retention valve is equal to or higher than a determination change rate, 1) assumes that that the predetermined suppression control permission conditions are satisfied and 2) executes the self-excited vibration suppression control on the differential pressure control valve.

11. The hydraulic control device for vehicles according to claim 10, further comprising a plurality of the differential pressure control valves, a plurality of the pressure adjusting units, and a plurality of hydraulic pressure circuits each having a respective differential pressure control valve of the plurality of the differential pressure control valves and a respective pressure adjusting unit of the plurality of the pressure adjusting units, wherein
each of the hydraulic pressure circuits is connected to the hydraulic pressure generating device, and
when the control unit executes the self-excited vibration suppression control on one of the plurality of differential pressure control valves, then the control unit also executes the self-excited vibration suppression control on the other of the differential pressure control valves.

12. The hydraulic control device for vehicles according to claim 10, wherein in the self-excited vibration suppression control, the control unit increases a force pressing the valve element against the valve seat when the valve element sits on the valve seat with an increase of the change rate of the current flowing in the retention valve.

13. The hydraulic control device for vehicles according to claim 12, further comprising a plurality of the differential pressure control valves, a plurality of the pressure adjusting units, and a plurality of hydraulic pressure circuits each having a respective differential pressure control valve of the plurality of the differential pressure control valves and a respective pressure adjusting unit of the plurality of the pressure adjusting units, wherein
each of the hydraulic pressure circuits is connected to the hydraulic pressure generating device, and
when the control unit executes the self-excited vibration suppression control on one of the plurality of differential pressure control valves, then the control unit also executes the self-excited vibration suppression control on the other of the differential pressure control valves.

* * * * *